US011155750B2

(12) United States Patent
Nevison

(10) Patent No.: US 11,155,750 B2
(45) Date of Patent: Oct. 26, 2021

(54) USE OF NATURAL GAS AS A SOLUBLE SERVICING GAS DURING A WELL INTERVENTION OPERATION

(71) Applicant: Halliburton Energy Services, Inc., Houston, TX (US)

(72) Inventor: Grant W. Nevison, Bragg Creek (CA)

(73) Assignee: Halliburton Energy Services, Inc., Houston, TX (US)

( * ) Notice: Subject to any disclaimer, the term of this patent is extended or adjusted under 35 U.S.C. 154(b) by 492 days.

(21) Appl. No.: 15/755,133

(22) PCT Filed: Sep. 8, 2016

(86) PCT No.: PCT/US2016/050700
§ 371 (c)(1),
(2) Date: Feb. 26, 2018

(87) PCT Pub. No.: WO2017/058487
PCT Pub. Date: Apr. 6, 2017

(65) Prior Publication Data
US 2020/0224080 A1 Jul. 16, 2020

Related U.S. Application Data

(60) Provisional application No. 62/235,147, filed on Sep. 30, 2015.

(51) Int. Cl.
*C09K 8/594* (2006.01)
(52) U.S. Cl.
CPC .................................. *C09K 8/594* (2013.01)

(58) Field of Classification Search
CPC ...................................................... C09K 8/594
See application file for complete search history.

(56) References Cited

U.S. PATENT DOCUMENTS

| 9,033,035 B2 | 5/2015 | Nevison |
| 2006/0065400 A1 | 3/2006 | Smith |
| 2013/0025870 A1 | 1/2013 | Berry et al. |

(Continued)

FOREIGN PATENT DOCUMENTS

| CA | 2844477 | 2/2012 | |
| EP | 0976911 | 2/2000 | |
| EP | 0976911 A1 * | 2/2000 | ............... C09K 8/52 |

OTHER PUBLICATIONS

International Search Report and Written Opinion of PCT Application No. PCT/US2016/050700 dated Dec. 12, 2016: pp. 1-16.

*Primary Examiner* — Crystal J Miller
(74) *Attorney, Agent, or Firm* — Chamberlain Hrdlicka

(57) ABSTRACT

Methods for servicing a hydrocarbon well using natural gas in a well intervention operation can include preparing a working fluid having a composition comprising natural gas between about 5 mol % to about 100 mol %. During a well intervention operation at the specified well intervention conditions, the method can include injecting the working fluid into the well and contacting the working fluid with the recovery target material such that at least some of the natural gas dissolves into the recovery target material and forming a liquid phase well servicing mixture of the natural gas and recovery target material. At least some of the well servicing mixture can be recovered at surface.

16 Claims, 10 Drawing Sheets

(56) References Cited

U.S. PATENT DOCUMENTS

| | | | | |
|---|---|---|---|---|
| 2013/0341010 A1* | 12/2013 | Nevison | ............... | C09K 8/62 |
| | | | | 166/250.01 |
| 2014/0008074 A1* | 1/2014 | Nevison | ............... | C09K 8/62 |
| | | | | 166/308.6 |
| 2014/0034305 A1* | 2/2014 | Dawson | ............... | C09K 8/58 |
| | | | | 166/268 |
| 2014/0034322 A1 | 2/2014 | Gupta et al. | | |

* cited by examiner

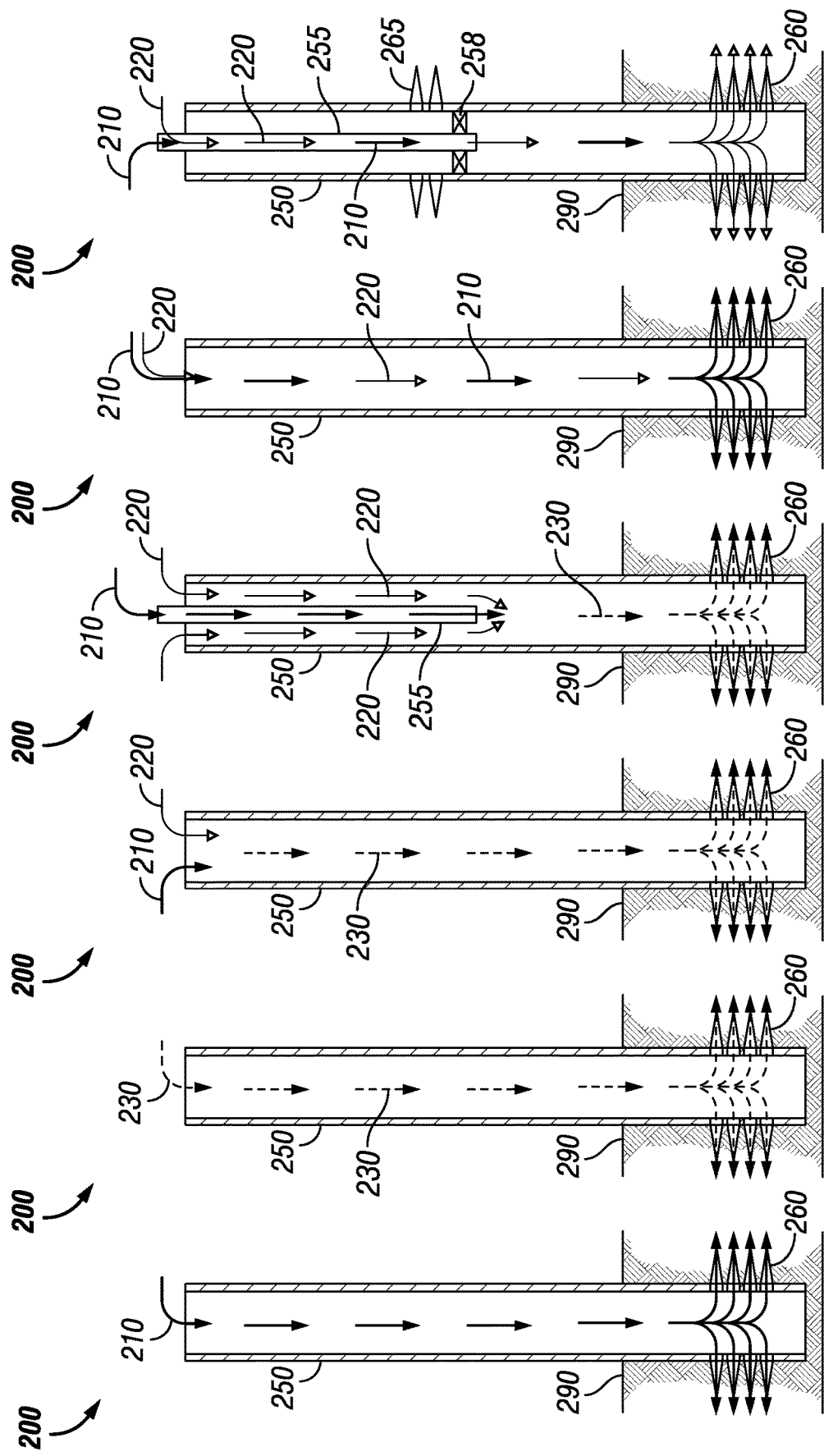

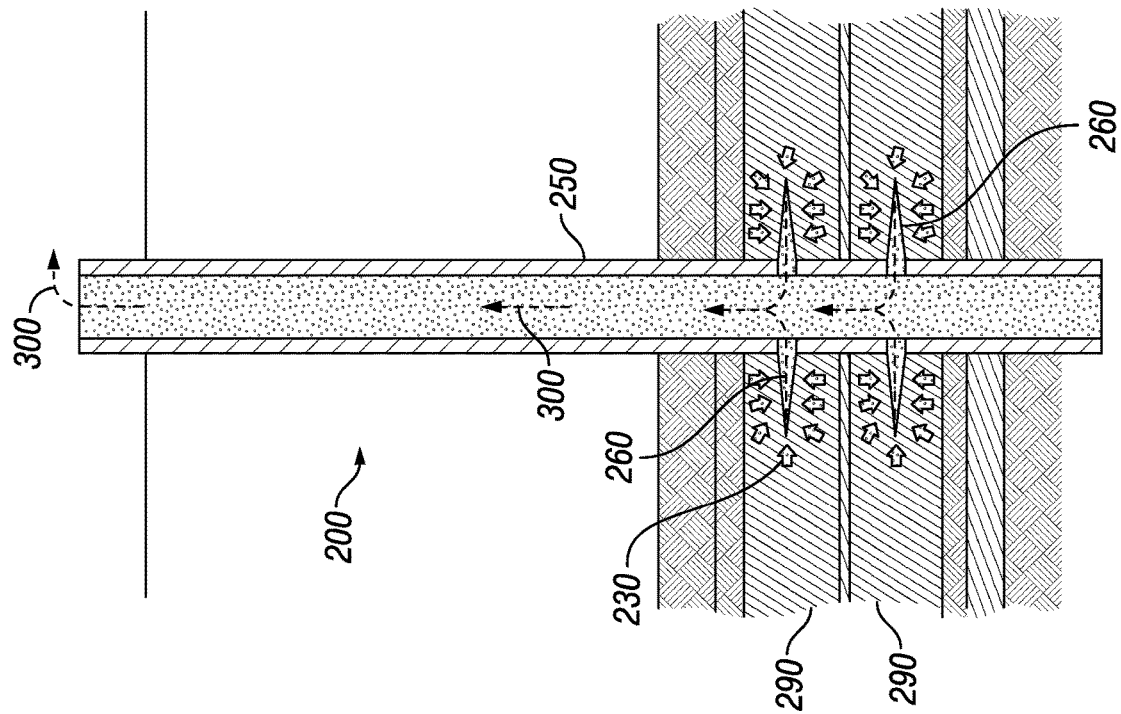
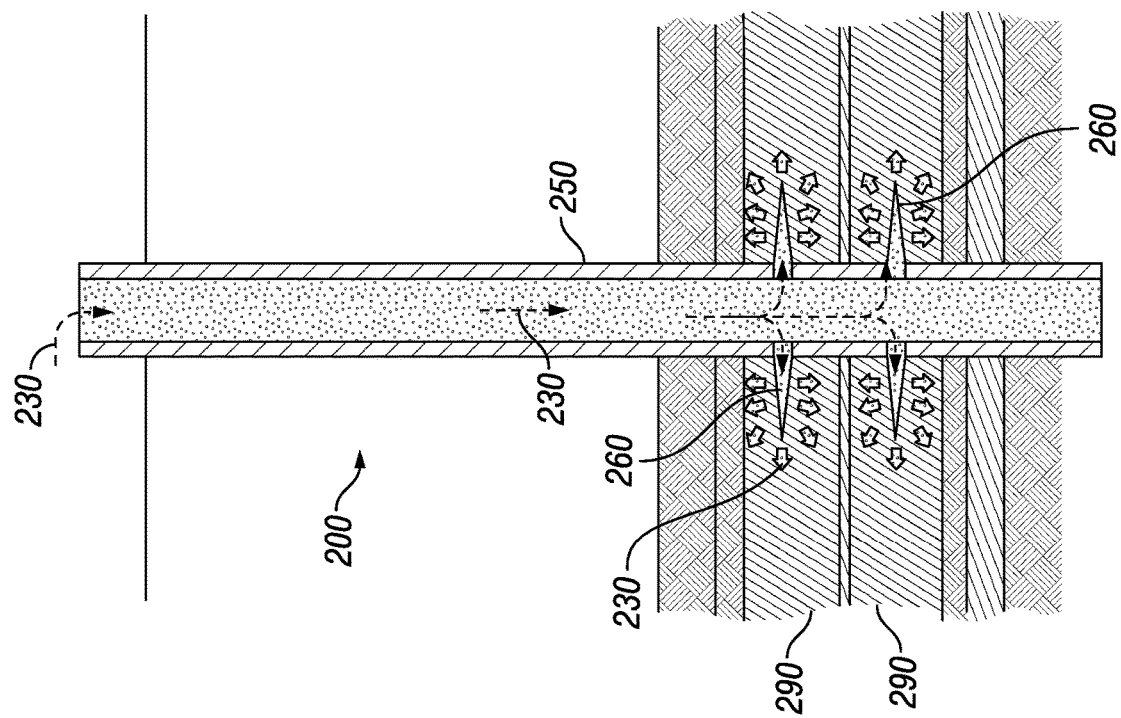

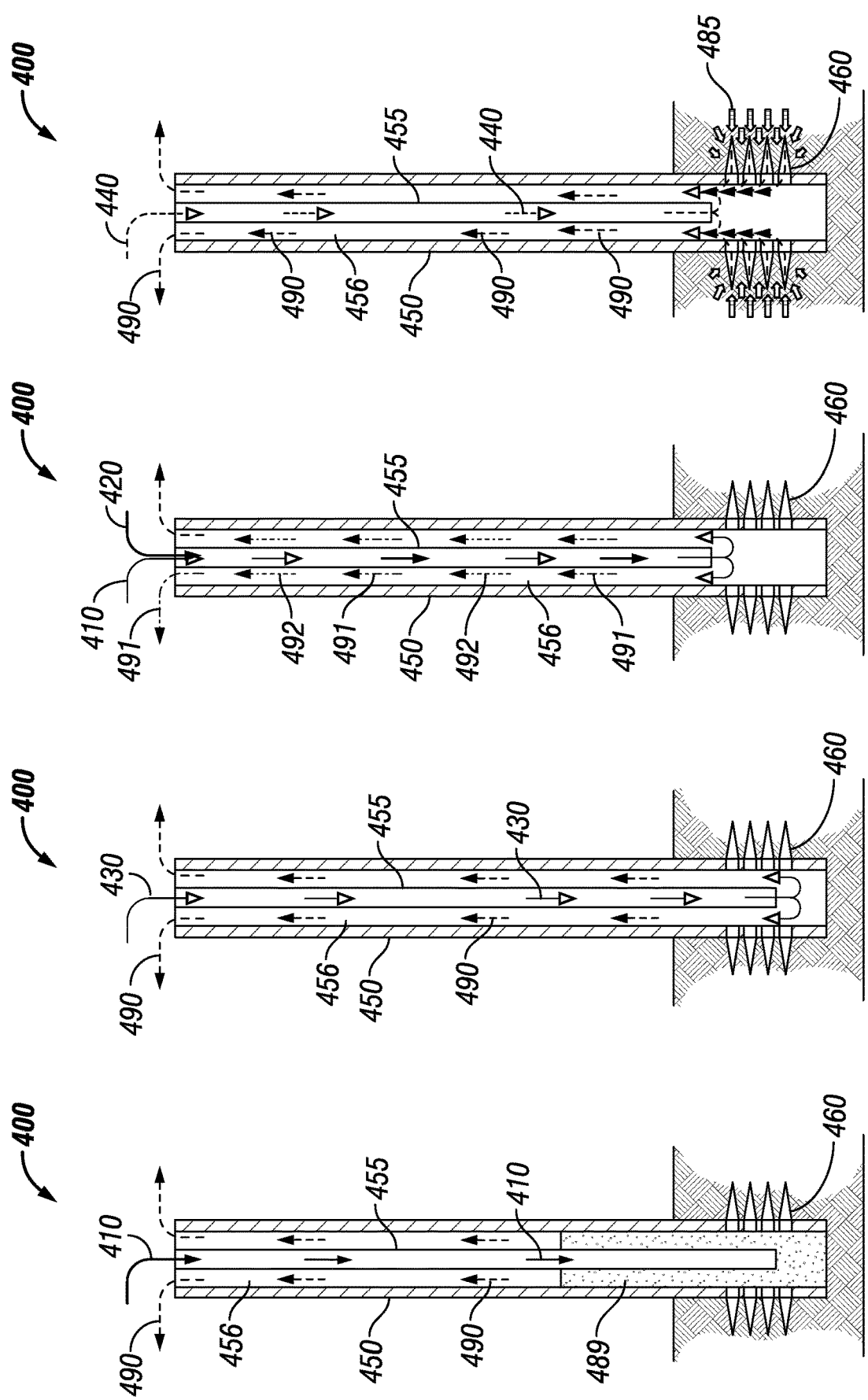

USE OF NATURAL GAS AS A SOLUBLE SERVICING GAS DURING A WELL INTERVENTION OPERATION

BACKGROUND

Well interventions are operations undertaken on oil or gas wells which alter the state of the well or wellbore, diagnose the well performance, or manage the production of the well. Well intervention operations can be applied to wells at any time following initial construction and can be applied to low rate wells, new wells, injection wells and wells that are no longer producing. Well intervention operations include activities completed within or to the wellbore or surrounding reservoir.

The ability to effectively manage the physical properties and behavior of fluids during well intervention operations becoming increasingly important. Efficient use of fluids will minimize applied volumes for reduced servicing and disposal costs and environmental impact while reduced or eliminated venting and flaring will reduce toxic emissions and greenhouse gases. Given the challenges with existing approaches to managing fluids used in well servicing operations, it is desirable to provide improvements to such existing approaches.

BRIEF DESCRIPTION OF THE DRAWINGS

Embodiments of the invention will now be described with reference to the accompanying drawings in which:

FIGS. 3A-3F are schematic illustrations of different configurations for injecting working fluids into a well during a reservoir matrix well servicing operation according to the method.

FIGS. 4A and 4B are schematic illustrations of injection and recovery sequences during a matrix well servicing operation according to the method.

FIGS. 5A-5D are schematics illustrating some configurations for circulating natural gas and well servicing fluid mixtures into a well during a circulation well servicing operation according to the method.

DETAILED DESCRIPTION

Figure 1:
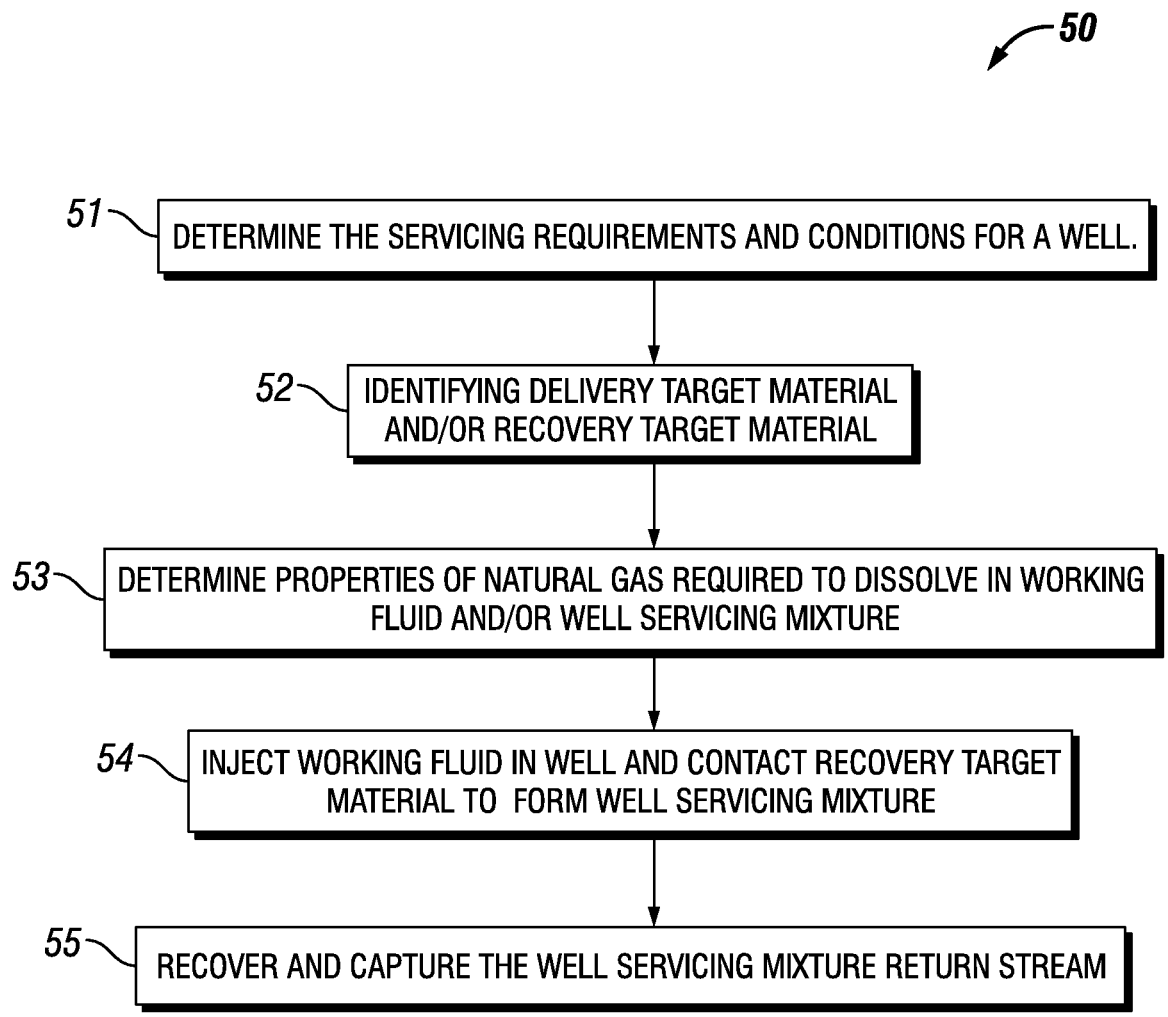
FIG. 1 is a flowchart depicting a method of servicing a well using a working fluid comprising natural gas dissolved in a delivery target material and/or forming a well servicing mixture containing natural gas dissolved in a recovery target material, according to one or more embodiments.

The embodiments described herein relate generally to a method for manipulating certain properties of a working fluid used during a well servicing operation (a type of a well intervention operation) to place or remove materials within a well, and to achieve certain behavior of liquids within a well servicing mixture formed during the well servicing operation, wherein natural gas serves as a soluble servicing gas in the working fluid and well servicing mixture (herein referred to as "natural gas well servicing method"). Some embodiments disclose a method of servicing a well comprising selecting a working fluid comprising natural gas, wherein at least some of the natural gas dissolves in a liquid phase recovery target material at specified well intervention conditions, injecting the working fluid into a well and mixing the working fluid with the recovery target material at the specified well intervention conditions, to form a liquid phase well servicing mixture wherein at least some of the natural gas is dissolved into at least the recovery target material. The recovery target material can be a liquid phase unwanted material in the well, and the method further includes recovering the recovery target material along with at least some of the working fluid. In some embodiments, the working fluid includes natural gas and a liquid component in which the natural gas is dissolved. The liquid component can be a liquid phase delivery target material such as a treating substance that causes at least one of a physical or chemical change in an unwanted material or another recovery target material in the well; alternatively, the liquid component can be a well servicing liquid in which case the working fluid can further include a solid phase delivery target material (herein referred to as "well servicing fluid mixture"). The working fluid serves to place the delivery target material within a desired location in the well, and/or remove a recovery target materials from the well. In embodiments that have a liquid phase delivery target material, the quantity and composition of the natural gas is selected so that at least some of the natural gas dissolves in the liquid phase delivery target material at the specified well intervention conditions. In embodiments that have a solid phase delivery target material, at least some of the natural gas is dissolved in the well servicing liquid and the solid phase delivery target is mixed in the well servicing liquid to form the well servicing fluid mixture.

The working fluid containing dissolved natural gas can be formed at surface. The working fluid can also include a well servicing liquid. The well servicing liquid can be or include an aqueous, organic or hydrocarbon liquid or mixtures thereof. Aqueous based servicing liquids may include aqueous solutions containing dissolved components such as salts, acids (inorganic and organic), organics and alcohols. Organic well servicing liquids include alcohols, ketones, esters, amides, aldehydes, carboxylic acids and amides. Hydrocarbon well servicing liquids can be or include any hydrocarbon in a liquid state containing alkanes, alkenes and or aromatics. Treating materials can be or include chemicals or materials in liquid or solid phase selected for placement within, or to assist with, mobilization of pre-existing materials in the wellbore or reservoir. Alternatively, the treating material may be selected for placement within, or to assist with, consolidation of materials, to accomplish plugging or isolation, or to manage deposition of materials within the wellbore or reservoir.

As used in this disclosure, natural gas means methane ($CH_4$) alone or blends containing methane and lesser amounts other compounds, such as, but not limited to, one or more gaseous and/or liquid hydrocarbons and/or one or more natural contaminants, as is typically found in and produced from wells and found in reservoirs. For example, a contaminant can be or include carbon monoxide, carbon dioxide, nitrogen, argon, or any mixture thereof. Natural gas can include about 70 vol %, about 80 vol %, or about 90 vol % to about 95 vol %, about 97 vol %, about 99 vol %, or about 100 vol % of methane and can include 0 vol %, about 1 vol %, about 3 vol %, or about 5 vol % to about 10 vol %, about 20 vol %, or about 30 vol % of one or more other compounds. For example, natural gas can include about 70 vol % to about 100 vol %, about 70 vol % to about 99 vol %, or about 80 vol % to about 95 vol % of methane and about 0 vol % to about 30 vol %, about 1 vol % to about 30 vol %, about 5 vol % to about 20 vol % of one or more of ethane ($C_2H_6$), propane ($C_3H_8$), butane ($C_4H_{10}$), pentane ($C_5H_{12}$), longer chain hydrocarbons, isomers thereof, or any mixture thereof.

Natural gas composition varies widely depending upon its source and degree of processing. Raw natural gas may contain significant quantities of naturally occurring contaminants, including carbon dioxide, nitrogen, hydrogen sulfide, hydrogen, oxygen, or any mixture thereof and each contaminant can have a concentration up to 50 vol %. Further, it may contain water vapor to saturation often at levels exceeding 100 mg/m$^3$. Comparably, processed natural gas is much less variable in composition. Contaminants are typically removed to almost trace levels as are the longer hydrocarbon chains of $C_5$+. Processed natural gas can include about 87 vol % to about 97 vol % of methane, about 1.5 vol % to about 7 vol % of ethane, about 0.1 vol % to about 1.5 vol % of propane, about 0.01 vol % to about 1 vol % of butanes, about 0.01 vol % to about 1 vol % of pentane, less than 0.06 vol % of each longer chain hydrocarbon. Processed natural gas can include nitrogen gas at a concentration of up to 15 vol %, for example, about 5 vol % of less of nitrogen gas. Processed natural gas can include carbon dioxide at a concentration of up to 2 vol % and trace amounts of oxygen, hydrogen, hydrogen sulfide, or any mixture thereof. Processed natural gas can include water at a concentration of less than 32 mg/m$^3$. Processed natural gas can have a heating value of about 36 MJ/m$^3$ to about 40 MJ/m$^3$ on a dry basis. The most consistent processed natural gas is liquefied natural gas (LNG). Within North America, LNG can include 95 vol % or more of methane and less than 5 vol % total of ethane, propane, butane, or any mixture thereof, and only trace amounts of pentane and longer chain hydrocarbons. Nitrogen may be present in small quantities, less than 2 vol %, with carbon dioxide and water present at less than 50 ppm. Internationally, LNG may contain less than 85 vol % of methane with up to 15 vol % of ethane, over 2 vol % of propane and 1.5 vol % of butanes, and only traces of pentane and longer chain hydrocarbons. Again, nitrogen may be present in small quantities, less than 1 vol %, with carbon dioxide and water present at less than 50 ppm. LNG is a cryogenic liquid typically stored at −160° C. and near atmospheric pressure, usually not to exceed 700 kPa. Natural gas has a critical temperature of about −80° C.

The quantity of natural gas within the working fluid can be about 5 molar percent (mol %) to about 100 mol %; in embodiments where the working fluid includes a delivery target material such as a treating substance, the quantity of natural gas within the working fluid can be about 5 mol % to about 95 mol %.

As used in this disclosure, the following meanings are ascribed to the following terms. The delivery target material includes a treating material to be placed within a well during a well servicing operation. The recovery target material means a material to be removed from the well during a well servicing operation, including unwanted materials and may include the recovery target material in an altered state or the products of a reaction between the recovery target material and the treating substance. The working fluid is the fluid injected at surface containing about 5 mol % to about 100 mol % of natural gas and optionally comprising either or both a treating material and a well servicing liquid. The well servicing mixture means the recovery target material and the natural gas dissolved therein. The well servicing mixture can form part of a recovery stream that is recovered to surface; the recovery stream can also include products from a treating material reaction or dissolution, and optionally reservoir sourced materials. The recovery stream is the well servicing effluent as recovered at surface at the recovery conditions.

As used in this disclosure, hydrocarbon well servicing liquids includes any hydrocarbon in a liquid state at the servicing conditions containing alkanes, alkenes and or aromatics. The hydrocarbon compositions may include hydrocarbons or hydrocarbon blends having carbon chain lengths primarily from two carbons, $C_2$, through to fifty carbons, $C_{50}$. Preferentially, an injected hydrocarbon liquid will be of a composition such that the volatility will be suitable for completion of safe well servicing operations, such as those liquids with volatility below a Reid vapor pressure of 2 psi. Alternatively, higher Reid vapor pressure liquids or liquefied petroleum gases may be applied; however special equipment or procedures may be required for safe application. Further, the preferential hydrocarbon liquid will not contain detrimental quantities of asphaltene, bitumen or paraffin which may have adverse effects to the wellbore, reservoir or servicing operation.

As used in this disclosure, treating materials can be or include chemicals or materials selected for placement within, or to assist with, mobilization of materials from the wellbore or reservoir. Mobilization of materials is accomplished by loosening, dispersing, reacting or in some manner altering the state of the material contained within the well and to be removed. The altered state of the material to be removed may be selected to allow or enhance its mixing into the well servicing mixture. Alternatively, the treating material may be selected for placement within, or to assist with, consolidation of materials, or to accomplish plugging or isolation within the wellbore or reservoir. Treating chemicals or treating materials, referred to collectively as the treating material, include aqueous solutions of salts, salts, water soluble organic materials, acids and acid blends, hydrocarbon liquids, natural gas, natural gas liquids, hydrocarbon solvents, biocides, gellant breakers, pH buffers, pH control, clay stabilizers, crosslinkers, gellant viscosifiers, friction reducers, non-emulsifiers, surfactants, scale inhibitors, coated proppant activators, anti-sludge agents, asphaltene modifiers, corrosion inhibitors, defoamers, demulsifiers, diverting agents, foaming agents, hydrogen sulfide scavengers, iron control agents, iron sequestering agents, proppants, ball sealers, neutralizing agents, scale removers & inhibitors, solvents, mutual & miscible solvents, wax dispersants & solvents, density control materials and lost circulation materials, all of which are known in the art of well servicing treating materials. The treating material or materials may be applied singularly, in combination and with or without an accompanying well servicing liquid.

FIG. 1 is a flowchart depicting a natural gas well servicing method 50 that can use a working fluid containing natural gas dissolved in a delivery target material and/or forming a well servicing mixture containing natural gas dissolved in a recovery target material, according to one or more embodiments.

At 51, the natural gas well servicing method 50 can include determining a well servicing requirement and certain well servicing conditions within a well that can include a wellbore and a reservoir.

At 52, the natural gas well servicing method 50 can include identifying a liquid or solid phase delivery target material and/or a liquid phase recovery target material.

At 53, the natural gas well servicing method 50 can include determining certain properties of natural gas and the delivery target material required to form a working fluid wherein the natural gas dissolves in a liquid component of the working fluid wherein the liquid component is a liquid phase delivery target material or a well servicing liquid (optionally mixed with a solid phase delivery target material), and/or determining certain properties of natural gas and the recovery target material required to form a well servicing mixture wherein the natural dissolves in the recovery target material at the well servicing conditions.

At 54, the natural gas well servicing method 50 can include preparing a working fluid having one of the determined properties and injecting the prepared working fluid into the well to place the delivery target material and/or to contact the recovery target material and cause the natural gas to dissolve in the recovery target material and form the desired liquid phase well servicing mixture at the servicing conditions.

At 55, the natural gas well servicing method 50 can include recovering and capturing a recovery stream at determined recovery conditions and which can include at least some of the well servicing mixture. The well servicing requirements can include delivering a treating substance (the delivery target material) to a location in the well, and/or a recovering an unwanted substance (the recovery target material) in the well. The well servicing conditions can include: reservoir temperature and pressure, reservoir fracturing pressure, surface recovery pressure, servicing depth and wellbore configuration and geometry. The determined properties of the natural gas include the quantity and composition of the natural gas, the determined properties of the delivery and recovery target materials include the density of the treating substance and unwanted substance, respectively.

Solubility or mixing of the natural gas within the injected working fluid or formed well servicing mixture is at least moderate at the well servicing conditions such that a sufficient quantity of natural gas dissolves into the servicing fluid stream to achieve the desired behavior. Injection into the well is at selected injection or circulation pressures and temperatures to provide the desired pressure and temperature at a servicing location within the well to promote the desired behavior at the servicing conditions. As will be discussed in greater detail below, the composition and quantity within the mixture of all of the well servicing liquid, the target materials, the well contents, and the reservoir fluids, along with the composition and quantity of natural gas, in conjunction with the servicing injection and recovery conditions can be manipulated to create the desired behaviors of the working fluid and well servicing mixture during the well servicing steps. The quantity of natural gas dissolved in the formed mixture and the temperature and injection/circulation pressure can be manipulated so that the mixture has the desired dissolved gas liquid behaviors during the well servicing operation. The mixture behaviors include a particular dissolved natural gas content, density, viscosity, surface tension and total mixture volume. This method is undertaken with the objective of improving performance of the servicing operation.

When the selected desired behavior is dissolved gas volume, the method in one aspect can also include determining the natural gas solubility of the recovery target material in the well servicing mixture and/or in the working fluid, having the selected quantity of natural gas in the mixture, and injecting/circulating the working fluid into the wellbore or reservoir of a well at a selected injection pressure and injection temperature such that the well servicing mixture can include a desired dissolved gas volume at the servicing conditions within the wellbore or reservoir, and wherein at least some of the gaseous phase natural gas is not dissolved in the recovery stream during recovery. In this aspect, the injection pressure and temperature and recovery pressure can be selected so that the injected/circulated working fluid, or the well servicing mixture created within the wellbore, is saturated with natural gas at the servicing point within the well and the recovery point. When the selected desired behavior is working fluid or well servicing mixture density, the method can also include determining the required quantity of dissolved natural gas in the working fluid or the recovery target material required to achieve a desired density of the working fluid or well servicing mixture during the well servicing operation. When the selected desired behavior is mixture viscosity, the method can also include determining the required quantity of dissolved natural gas in the recovery target material or working fluid to achieve a desired viscosity of the working fluid or well servicing mixture, respectively, during the well servicing operation. When the selected desired behavior is working fluid or well servicing mixture surface tension, the method can also include determining the required quantity of dissolved natural gas in the working fluid or recovery target material to achieve a desired surface tension of the well servicing mixture during the well servicing operation. When the selected desired behavior is total working fluid volume, the method can also include determining the required quantity of dissolved gas in the well servicing mixture to achieve a desired total volume of the working fluid during the well servicing operation. When the selected desired behavior is dissolved natural gas content, the method can also include determining the required quantity of dissolved natural gas in the working fluid or recovery target material to achieve a desired dissolved gas content within the working fluid or well servicing mixture during the well servicing operation.

Figure 2:
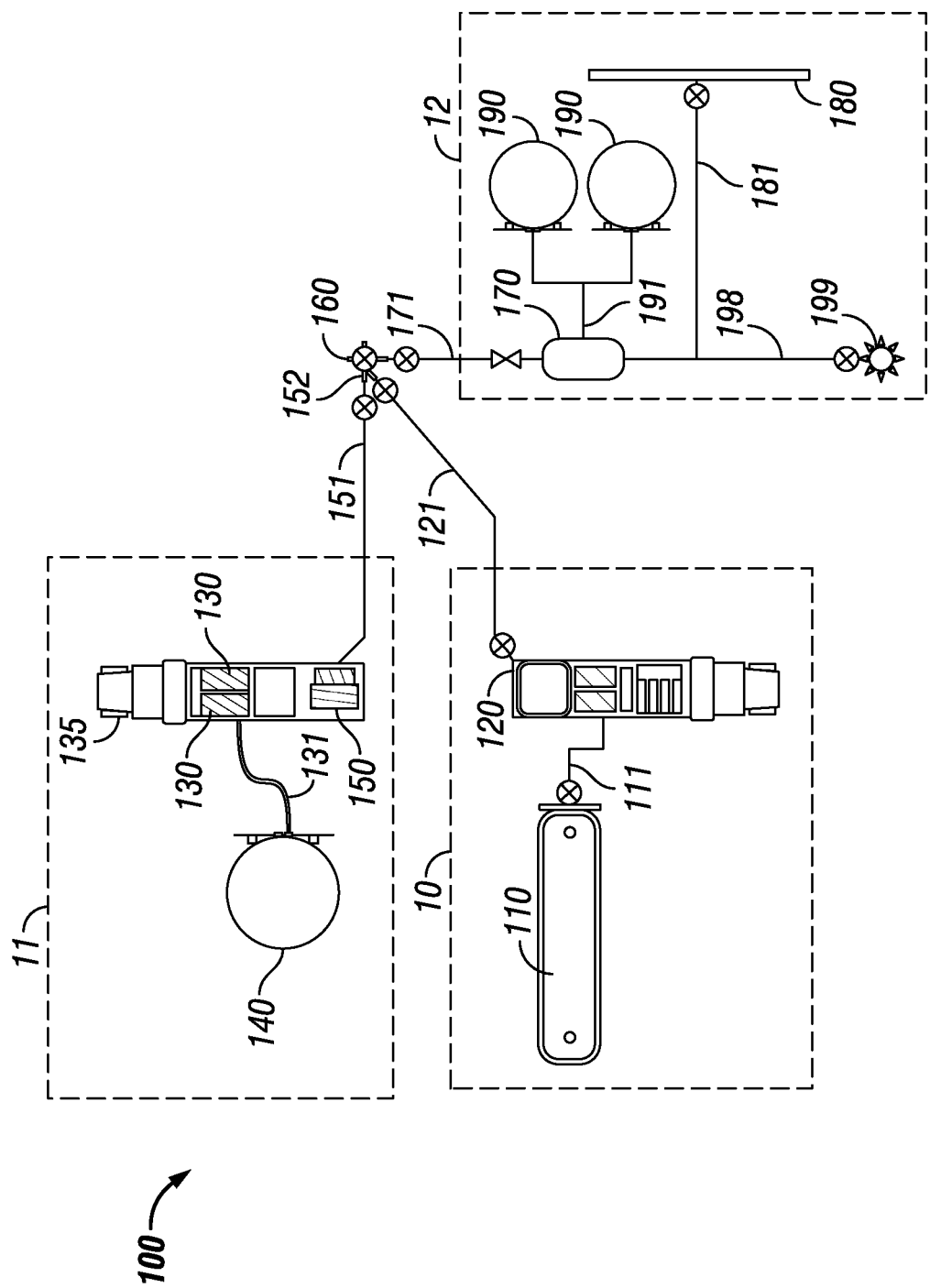
FIG. 2 is a schematic of a well servicing system for injecting and recovering a working fluid containing natural gas into a wellbore or underground formation of a well according to the method.

The embodiments described herein utilize well servicing equipment 100 as shown in FIG. 2 to carry out the natural gas well servicing method as depicted in FIG. 1.

More particularly, FIG. 2 illustrates one configuration of well servicing equipment for applying, recovering and capturing a natural gas and well servicing liquid stream in a closed system well servicing operation. The well servicing equipment 100 includes the preparing and pressurizing equipment 11 that can include servicing liquid tank 140 that contains the liquid servicing fluid; a well servicing utility unit 135 that contains and applies the treating material stored in one or more mounted treating material tanks 130 (two are shown in FIG. 2). The servicing liquid from servicing liquid tank 140 and treating material from treating material tank 130 may be combined within the well servicing utility unit 135 to form a prepared fluid then fed to a mounted service pump 150, again within the well servicing utility unit 135, where the well servicing fluid is pressured to well servicing injection pressure. The servicing liquid tank 140 is fluidly coupled to the treating material tank 30 by liquid conduit 131.

The well servicing equipment 100 also includes natural gas preparation equipment 10 that can include mobile storage vessel 110 that can store the natural gas in a liquefied state (e.g., LNG); a LNG servicing pumper 120 that pressurizes the LNG to well servicing conditions and then heats the LNG to a desired injection temperature. The mobile storage vessel 110 is fluidly coupled to the LNG servicing pumper by an LNG conduit 111.

The well servicing equipment 100 also includes a component 152 for alternately injecting or combining the prepared fluid (via conduit 151) and the gaseous natural gas stream (via conduit 121) to form the working fluid and directing this mixture to a wellhead 160. In this manner the working fluid containing about 5 mol % to about 100 mol % natural gas is prepared and injected into the wellbore of a well (not shown) and optionally into a reservoir of the well (not shown) to undertake the servicing operation.

With continued reference to FIG. 2, a flow back system 12 is provided to process and capture a well servicing effluent stream received from the wellhead 160 via conduit 171. A four phase separator 170 coupled to the conduit 171 separates recovered gases from a recovery stream containing injected and native natural gas, solids and liquid streams. The recovered liquids are further separated within the separator 170 between aqueous and non-aqueous streams, including the resulting treating material liquids and produced native reservoir liquids, are directed to closed liquids recovery tanks 190 via a liquids conduit 191. Liquids recovery may or may not involve a tank; rather they can be directed to a liquids suitable pipeline (not shown) for processing should that facility exist. Recovered solids may be captured within the separator 170 and require periodic removal as they accumulate. The recovered gases from separator 170 including the applied natural gas and produced reservoir gases, are directed to a gas pipeline 180 via a gas conduit 181, where they are directed to a facility (not shown) for processing, sale or re-use. In this or a similar manner, an environmentally closed well servicing system can be created and applied permitting well servicing operations to be completed without venting or flaring to a flare 199 via conduit 198.

The well servicing injection, circulation and flow back operations in accordance with at least one embodiment will now be described with reference to FIGS. 3A-3F, 4A, 4B, and 5.

Referring now to FIGS. 3A-3F, a number of different injection configurations can be used to form a working fluid 230 and inject the working fluid 230 into a wellbore 250 of a well 200 during a matrix well servicing operation. In a first injection configuration as shown in FIG. 3A, the working fluid 230 can be or include a 100 mol % natural gas stream 210 supplied by the natural gas preparation equipment 10. In a second well injection configuration as shown in FIG. 3B, the working fluid 230 can be or include a mixture of the natural gas and the well servicing liquid (which may optionally include a solid phase delivery target material) that are combined prior to the working fluid being injected into the wellbore 250. In a third well injection configuration as shown in FIG. 3C, the working fluid 230 is formed in the wellbore 250 from the concurrent injection of the natural gas stream 210 and a well servicing fluid mixture 220 (which can include a well servicing liquid and optionally a solid phase delivery target material) into the wellbore 250. In a fourth well injection configuration as shown in FIG. 3D, a tubular conduit 255 is provided within the wellbore 250; the tubular conduit 255 may be a temporary working conduit such as provided by coiled tubing. The natural gas stream 210 is injected into tubular conduit 255; concurrently, the well servicing fluid mixture 220 is injected into the wellbore 250 outside of the tubular conduit 255 to mix with the natural gas at a discharge end of the tubular conduit 255 in the wellbore 250 to form the working fluid 230. In a fifth well injection configuration as shown in FIG. 3E, the natural gas stream 210 is injected into the wellbore 250 with well servicing fluid mixture 220 in a sequential manner to minimize mixing within the wellbore 250 or reservoir 290 during injection. In a sixth well injection configuration and as shown in FIG. 3F, the tubular conduit 255 is inserted into the wellbore 250 and is hydraulically isolated at least at one point using one or more packers 258; the natural gas stream 210 and well servicing liquid 220 can then be sequentially injected through the tubular conduit 255 into the wellbore 250 (as shown in FIG. 3F); alternatively, a working fluid 230 comprising 100% natural gas or comprising a mixture of natural gas and well servicing liquid can be injected through the tubular conduit 255.

In each of the injection configurations shown in FIGS. 3A-3F, the working fluid 230 is injected into the wellbore 250 and in some cases also through perforations 260 in the well and into a reservoir 290 of the well. The working fluid 230 mixes with a recovery target material (not shown) contained within one or more of the wellbore 250, the perforations 260 and the reservoir 290 to form a dissolved gas well servicing mixture. In each of the well injection configurations shown in FIGS. 2A-2F, multiple conduits (not shown) can exist within the wellbore 250 that are configured for injection and multiple distinct reservoirs (not shown) or multiple points within a distinct reservoir can hydraulically communicate with the wellbore 250, e.g., a horizontal wellbore. Hydraulic communication between the wellbore 250 and the reservoir 290 may be provided by methods known within the industry including perforations, slots, liners, sliding sleeves and screens.

Referring now to FIGS. 4A and 4B, after the working fluid 230 has been injected into the wellbore 250 and/or reservoir 290 of the well 200, the dissolved gas well servicing mixture is recovered to surface as part of a recovery stream. FIG. 4A illustrates a well servicing injection operation into the well 200 can include the wellbore 250, perforations 260 and a reservoir 290. The working fluid 230 enters the wellbore 250 and flows through the perforations 260. From perforations 260 the working fluid 230 moves through the permeations in the reservoir 290 and occupies the pores, fissures and/or fractures within the reservoir 290. Within the pores the injected working fluid 230 will at least displace and mix with native reservoir fluids and other contained materials and potentially contact the reservoir rock forming the matrix. The working fluid can be designed to reduce viscosity, density or surface tension of the recovery target material or the delivery target material, and/or increase volume of the delivery target material, by dissolving the natural gas within the delivery target material, thereby enhancing the working fluid 230 movement through the pores, fissures and fractures. Should unwanted materials be present, such as waxes, emulsions or precipitates, the dissolved natural gas working fluid 230 will displace, mix and contact those unwanted materials as well. A selected treating material for the unwanted material can be included within the injected working fluid 230, and cause the unwanted material(s) to react, dissolve or in some manner dissociate and be entrained into the injected working fluid 230, or commingle with undissolved natural gas from the working fluid to have that natural gas dissolve into the altered unwanted material to form a dissolved gas well servicing mixture. Upon injecting sufficient working fluid 230 to contact the desired pores within the reservoir 290, injection is stopped and any treatment material in the working fluid 230 is left in place for a sufficient time to achieve a desired effect on the unwanted material(s), e.g., completion of chemical reaction, dissolution of solids, mixing of liquids, diffusion between phases, to reach equilibrium with other materials, to effect a phase change, to evaporate or to condense.

Treating materials known in the art are selected to remain at least in part within the reservoir 290 or wellbore 250 following completion of the well servicing operation may be placed into the well 200 using the working fluid 230. The treating materials are selected to remain for a time within the reservoir 290, perforations 260 or wellbore 250 to complete a temporary or longer term beneficial purpose; such as wax crystal modifiers to reduce wax deposits, scale inhibitors to reduce scaling, reservoir plugging materials to reduce water production and perforation sealers for temporary reservoir isolation from the wellbore. Reduction of viscosity, density or surface tension and increases in volume due to dissolved gas within a liquid phase delivery target material of the injected working fluid 230 or within a well servicing liquid mixed with a solid phase delivery target material, will enhance working fluid 230 movements through the pores, fissures and fractures to optimize placement of the delivery target material within the reservoir. In this manner the working fluid 230 may be applied to the well servicing operation to efficiently place natural gas alone or along with treating materials into the wellbore 250 or the reservoir 290 matrix or to cause removal of unwanted materials from the wellbore 250 or the reservoir 290 matrix. Further, use of natural gas as a soluble gas permits gas evolution during recovery to improve control of hydrostatic pressures during the recovery operation to assist the flow behavior to remove the components to be recovered from the well servicing operation.

Further, injection of the working fluid 230 may be completed into the matrix of a reservoir 290 for the purpose of pressuring the reservoir 290 to achieve a desired effect or as a means to assess the injection, flow capacity or in some way evaluate the reservoir. Desired effects achieved by pressuring the reservoir 290 may include improvements in subsequent flow back rates through the reservoir to better entrain unwanted materials to form a well servicing mixture, improvements in pressure sensitive properties of existing fluids or materials within the matrix, or alternations of rock stress profiles within the pores.

Referring now to FIG. 4B, the well servicing mixture 300 can include at least some of the natural gas in the working fluid 230 and entrained materials or materials resulting from the servicing operation (e.g., the recovery target material) and native reservoir fluid. In order to begin production of native reservoir fluids, a sufficient amount of the recovery target material is removed from the underground reservoir 290 and the wellbore 250 by opening the well, and flowing a recovery stream comprising the well servicing mixture 300 ("recovery stream 300") from the underground reservoir 290 through the reservoir matrix and up the wellbore 250 and to a flow back system (not shown).

If sufficient reservoir pressure exists to overcome the capillary and viscous flowing forces holding the liquids in place inside the reservoir 290 (collectively "reservoir resistive effects"), as well as the bottom hole flowing pressure, the recovery stream 300 may flow from the reservoir 290 up the wellbore 250, through any surface flow back equipment and into a processing facility or into a pipeline for flow to a remotely located processing facility (not shown). The bottom hole flowing pressure can include frictional losses of the flow from the perforations to surface ("flowing friction pressure"), plus the hydrostatic pressure, plus any surface equipment pressure losses, and the capture system inlet pressure. If the reservoir pressure cannot overcome the existing reservoir resistive effects and bottom hole flowing pressure, a certain amount of natural gas can be added to the working fluid 230 to reduce the capillary and viscous flowing resistive effects of the liquids and to evolve the dissolved gas within the wellbore and hence increase the wellhead flowing pressure such that the recovery stream 300 can overcome any surface flow back equipment pressure losses and still have a sufficient pressure at the capture system inlet to meet inlet pressure requirements for a pipeline or processing facility. Additionally, natural gas in the working fluid serves to reduce the liquid content placed into the reservoir 290 during the servicing operation, to evolve and expand upon opening the well 200 to maintain pressure to drive fluids from the reservoir matrix, and, by evolution of gas from the liquids in the returning flow stream, reduce the density and hence the hydrostatic pressure of the fluids flowing in the wellbore 250. The liquid content can be optionally reduced to a level which meets pipeline and processing facility compositional requirements, or at least to a level which can be captured by closed storage tanks, thereby avoiding the need to expose the liquids to the environment by depositing into open tanks.

Referring now to FIGS. 5A-5D, and according to another embodiment, a well servicing method for circulation operations uses a working fluid comprising natural gas that dissolves in a well servicing liquid to form a working fluid or a recovery target material to form a well servicing mixture. In the former case, the working fluid can also include a solid phase delivery target material mixed with the well servicing liquid. Each of the FIGS. 5A-5D shows a different circulation mode of the circulation operation. In each circulation mode, a tubular conduit 455 is inserted into a wellbore 450; the conduit 455 may be a temporary work string such as that provided by coiled tubing. The bore of the tubular conduit 455 defines one fluid flow path, and the annular space 456 defined between wellbore 450 and the tubular conduit 455 defines a second fluid flow path. During circulation operations, perforations 460 may not be in place, be physically isolated from the circulation flow, left open to the wellbore 450 or be temporarily plugged to prevent inflow of the well servicing fluid mixtures to the reservoir.

As shown in FIG. 5A and according to a first circulation mode, a working fluid comprising natural gas 410 is injected into the well with flow within one flow path (injection flow), while fluids displaced from the well flow to surface within the other flow path (return flow) to form a circulation path; either flow path 455, 456 can serve as the injection or return flow. The circulating pressure at any point within the wellbore 450 is determined by the surface injection pressure and temperature, the hydrostatic and friction pressure along the circulation path, and finally the wellhead flowing pressure of the return flow stream. The working fluid 410 is injected down conduit 455 and contacts the unwanted material 489 ("recovery target material") within the wellbore 450. The recovery target material 489 can be a liquid. By mixing with the recovery target material 489 from the circulation injection flow, the natural gas working fluid 410 will at least displace, mix or entrain the recovery target material 489 causing at least some of the natural gas to dissolve in the target material, to form a returning well servicing mixture 490 to surface as recovery stream 491. By continued injection through conduit 455, the formed well servicing mixture 490 is circulated from the wellbore 450; transporting the recovery target material 489 up the wellbore 450 with the natural gas through the return conduit 456.

As shown in FIG. 5B and according to a second circulation mode, a natural gas well servicing fluid mixture 430 comprising natural gas and a well servicing fluid mixture containing at least a treating material is injected into the well through flow path 455 with the return well servicing mixture stream 490 returning to surface through flow path 456. The injection stream may serve to deposit treating materials ("delivery target material") into the wellbore 450, or alternately remove unwanted materials (not shown, "recovery target material") from the wellbore 450. Such treating materials include: inhibitors for wellbore corrosion protection, wax solvents to liquefy wax deposits, sulfur solvents dissolve sulfur or methanol to dissolve hydrates. Unwanted materials include hydrates, wax, sulfur or accumulated reservoir liquids. The treating material can be in a liquid phase in which at least the natural gas is dissolved therein, or in a solid phase in which case the treating material is mixed in the well servicing liquid.

As shown in FIG. 5C and according to a third circulation mode, the natural gas 410 and a well servicing fluid mixture 420 are injected sequentially into the wellbore 450 through flow path 455 to form the working fluid and the recovery stream 491 is recovered via flow path 456. In this application, the well servicing fluid mixture 420 contains a treating material and/or a well servicing liquid and optionally dissolved natural gas to create a desired behavior. Sequential injection may permit placement of a concentration of treating material or well servicing fluid mixture 420 with sufficient natural gas such as to, at least to promote complete wetting of contacted materials or the wellbore to improve chemical attack on an unwanted material (not shown), provide a slug of dense material for improved solids transport, or deploy a highly viscous sweep fluid to efficiently transport materials after loosening or chemically reacting with a prior slug containing a treating substance. In recovery flow, mixing of natural gas 410 to dissolve into well servicing fluid mixture 420 is encouraged to provide beneficial behaviors to the so formed well servicing mixture. Mixing is completed by such as a density driven liquid fall back in upward return flow or gas phase bypass in horizontal flow. Further, mixing can be enhanced to at least a certain extent with selected fluid properties and injection rates. Beneficially, alternating injection of the well servicing fluid mixture 420 with natural gas 410 permits control of hydrostatics within the injection flow path 455 and return flow path 456 to manage pressure within the wellbore 450, for example at the perforations. In this manner a dissolved gas well servicing mixture can be formed within the wellbore from sequentially injected natural gas and well servicing fluid mixture. When deployed in this manner, the returning well servicing fluid mixture 492 may contain and serve to transport the greater portion of the unwanted materials to remove from the wellbore as displaced by the sequentially injected natural gas stream 491.

As shown in FIG. 5D and according to a fourth circulation mode, a working fluid comprising natural gas is injected into the well through injection flow path 455 with the return flow stream 490 flowing via return flow path 456. In this operation, the well servicing operation is conducted such that during the circulation operation the reservoir produces reservoir fluids 485. The produced reservoir fluids 485 are commingled with the well circulation return stream 490 which may also contain unwanted wellbore materials. Further, the produced reservoir fluids 485 may contain unwanted materials or servicing fluids from a previous servicing operation with the servicing operation completed to draw those unwanted materials from the reservoir. As illustrated for the well servicing injection operation, injection of natural gas 410 and the optional well servicing fluid mixture 420 to form a working fluid for circulation operations as illustrated in FIGS. 5A-5D can be completed in any number of wellbore configurations and with the natural gas working fluid formed at surface prior to entering the well or within the well where the components are injected at surface to form a well servicing mixture containing dissolved natural gas within the wellbore 450. Further, a multiple of conduits can exist within the wellbore configured for circulation and a multiple of distinct reservoirs or multiple points within a distinct reservoir may hydraulically communicate with the wellbore 450; such as in a horizontal wellbore. Hydraulic communication between the wellbore 450 and the reservoir may include those methods known within the industry including perforations, slots, liners, sliding sleeves and screens.

As will be discussed below, there are at least three different embodiments of the method of applying a working fluid comprising natural gas to complete well servicing operations, wherein the well servicing mixture at the application conditions and recovery stages of the well servicing operation include dissolved gas. A first embodiment involves selecting the composition of the working fluid to can be or include natural gas and a liquid phase delivery target material such that the injected working fluid places the delivery target material at a location within the well (wellbore or reservoir) during the well servicing operation and contains dissolved natural gas during the servicing steps and evolved natural gas during the recovery step of the servicing operation. A second embodiment involves selecting the composition of the working fluid to contain natural gas and a well servicing liquid such that the injected working fluid mixes with at least one recovery target material in the well (wellbore or reservoir) to form a well servicing mixture and the recovery target material is removed during the well servicing operation, and the well servicing mixture contains a dissolved natural gas during the servicing step and evolved natural gas during the recovery step of the operation. A third embodiment involves selecting the composition of the working fluid to contain 100% of natural gas such that the injected working fluid mixes with at least one recovery target material in the well to form a well servicing mixture and the recovery target material is removed during the well servicing operation, and the well servicing mixture contains dissolved natural gas during the servicing step and evolved natural gas during the recovery step of the operation.

A further fourth embodiment relates to well servicing operations using a natural gas working fluid and a well servicing fluid mixture containing a treating material and/or well servicing liquid and dissolved natural gas wherein the well servicing fluid mixture and the natural gas are injected into the wellbore sequentially and phase mixing between the fluids is minimized during injection in order to better maintain the individual behaviors or properties of the injected well servicing fluid mixture and natural gas working fluid.

In order to achieve the desired dissolved gas content and other behaviors of the well servicing mixture during the injection and recovery steps of the servicing operation, the operator should know the relationship between the desired behavior and the dissolved quantity of natural gas in the mixture at the servicing and recovery conditions; for example, when control of the dissolved gas content during the servicing operation is desired, the operator should know the relationship between dissolved gas volume, the servicing conditions and the desired behavior in order to create the desired behavior. Unique dissolved gas content exists for each possible composition of the well servicing mixture at the servicing conditions and for the composition at surface recovery conditions. The desired behavior of the well servicing mixture can thus be determined by selecting the quantity of natural gas within the natural gas working fluid.

Figure 6:
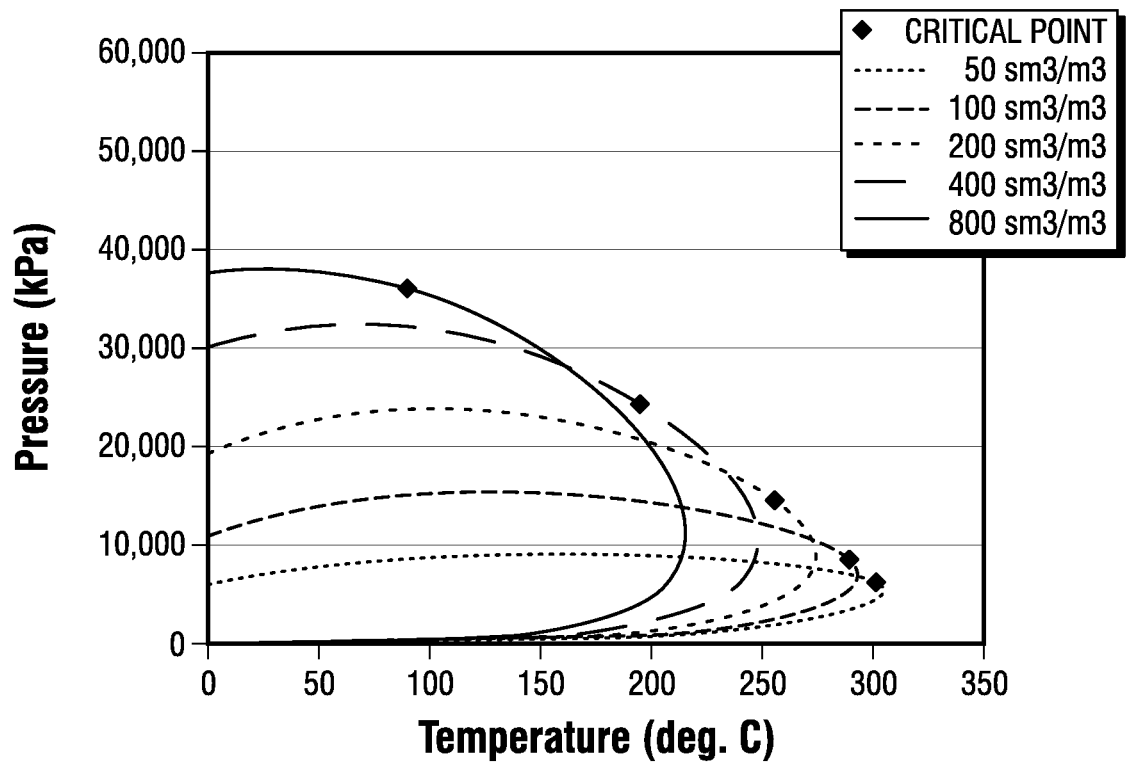
FIG. 6 is a graph of phase envelopes of mixtures comprising 760 kg/m3 hydrocarbon recovery target material with different gas ratios of natural gas.
Figure 7:
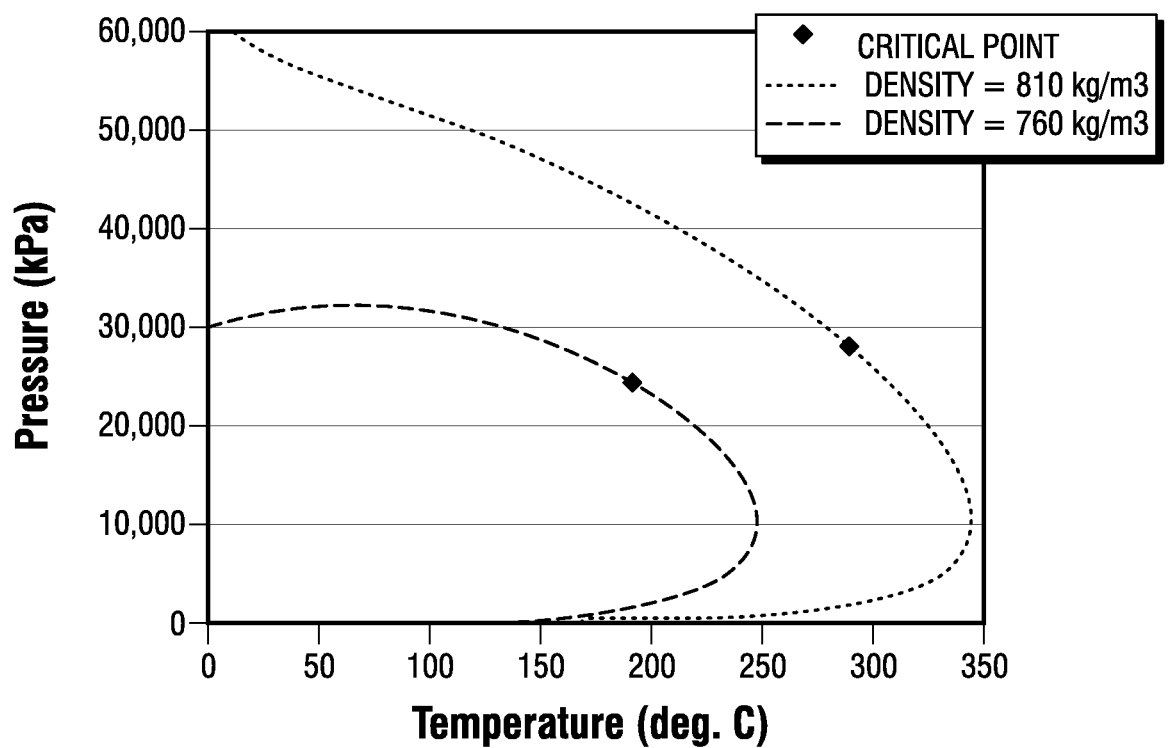
FIG. 7 is a graph of a phase envelopes of mixtures having different hydrocarbon densities and a natural gas ratio of 400 sm$^3$/m$^3$.

In common hydrocarbon liquids at typical application conditions, natural gas exhibits high solubility; in the order of 30 to over 800 standard volumes of natural gas dissolved in a unit volume of hydrocarbon liquid (expressed as the dissolved gas-oil ratio or GOR in $sm^3/m^3$). The resulting mixtures are selected to be applied below their critical temperatures where the mixture of hydrocarbon liquid with dissolved natural gas is in the liquid phase at the servicing conditions. The maximum dissolved gas capacity at pressure and temperature is illustrated in FIG. 6 where the phase envelopes below the critical temperature represent the bubble point condition of a 760 $kg/m^3$ density hydrocarbon liquid combined with various ratios of natural gas. FIG. 7 provides an example of the effect on dissolved natural gas behavior by increasing the hydrocarbon liquid density with the GOR held constant at an added natural gas ratio of 400 $sm^3/m^3$ liquid. In this instance the hydrocarbon composition is changed to effect the density change from 760 $kg/m^3$ to 810 $kg/m^3$ resulting in the large adjustment of the bubble point pressure and critical conditions as shown.

Figure 8:
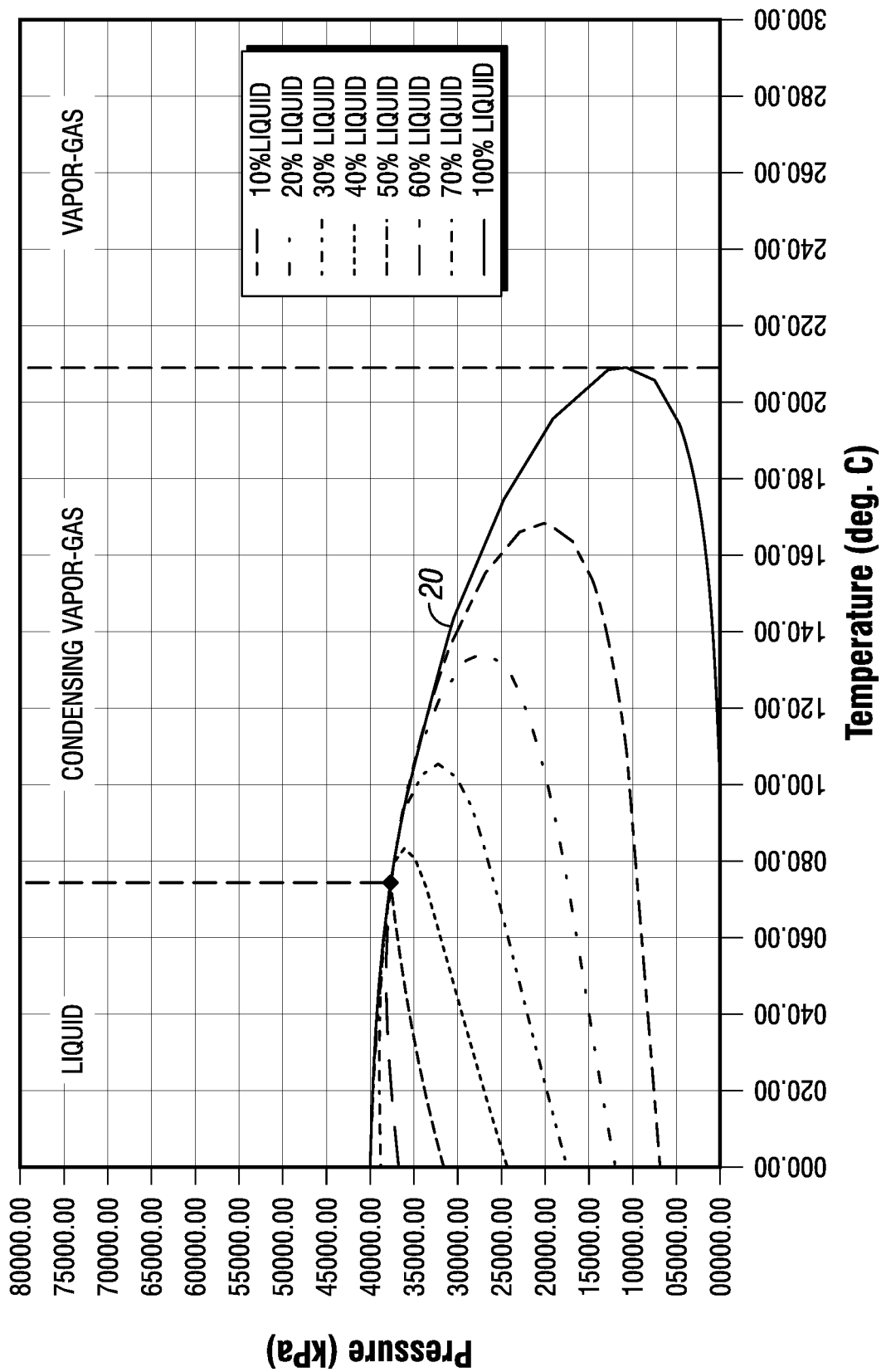
FIG. 8 is a graph of a phase envelope of a mixture having a 760 kg/m3 hydrocarbon at 875 sm$^3$/m$^3$ gas ratio.

With a given quantity of natural gas dissolved in the hydrocarbon, at pressures of and above each phase envelope and at temperatures below the critical point, the mixture is a saturated liquid. With reference to FIG. 8, at pressures and temperatures within the phase envelope, the mixtures exist in equilibrium in two phases providing a gas phase with a saturated liquid phase. Outside the phase envelop and at temperatures greater than the critical point, the mixture exhibits gas or vapor-like behaviors. For a hydrocarbon liquid at a given pressure and temperature, it is seen that the dissolved gas content of the mixture at a selected pressure and temperature can be determined by selecting the GOR. Inside the phase envelope of FIG. 8, quality lines are shown that provide the percent volume of liquid within the resulting two phase mixture. For a mixture comprising 760 $kg/m^3$ hydrocarbon liquid and 875 $sm^3/m^3$ added natural gas, wherein the mixture is at well conditions of 60° C. and 40,000 kPa, the mixture would be slightly above the bubble point and no gas phase would exist; in other words, the mixture is a fully saturated liquid phase mixture. With a mixture having the same overall composition and at the same temperature, but with pressure reduced to 24,000 kPa, the mixture will have a heterogeneous phase comprising a 30% liquid volume with a 70% gas volume; the hydrocarbon liquid volume is again saturated, however at a lower dissolved gas volume. For a given dissolved GOR, it can be seen that the evolved gas volume with pressure reductions can be determined. Further, it is seen that a quantity of dissolved gas remains within the liquid phase.

Figure 9:
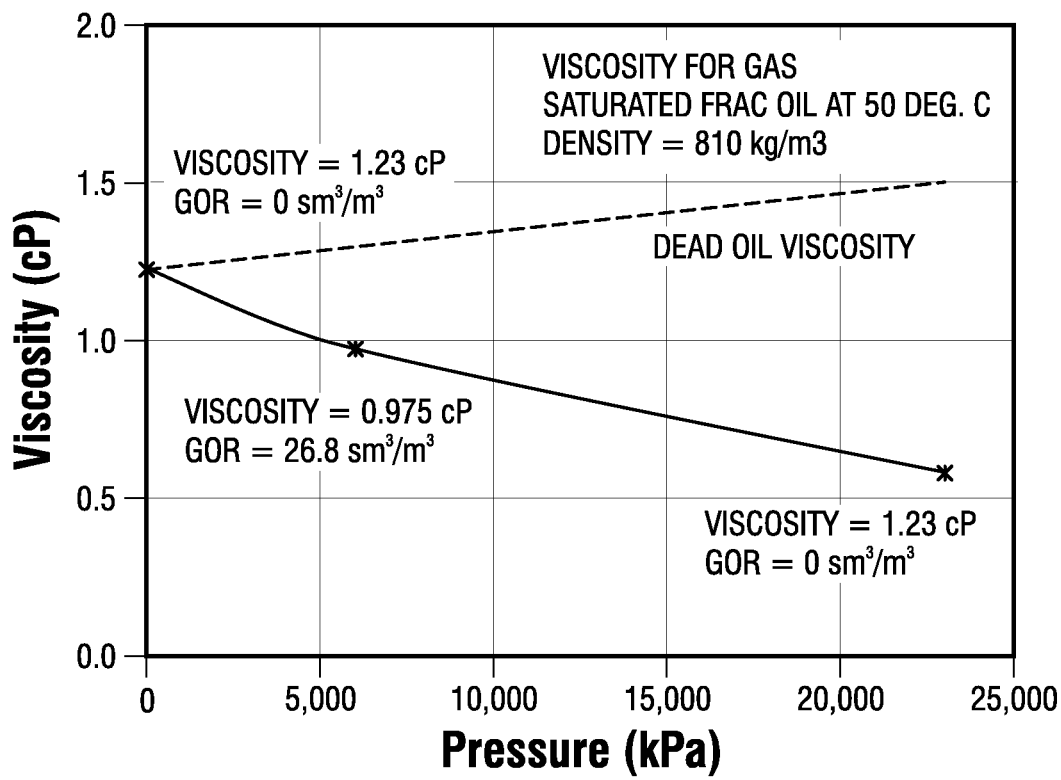
FIG. 9 is a viscosity-pressure graph of a of a mixture having a natural gas saturated hydrocarbon mixture with a density of 810 kg/m3 at 50° C.
Figure 10:
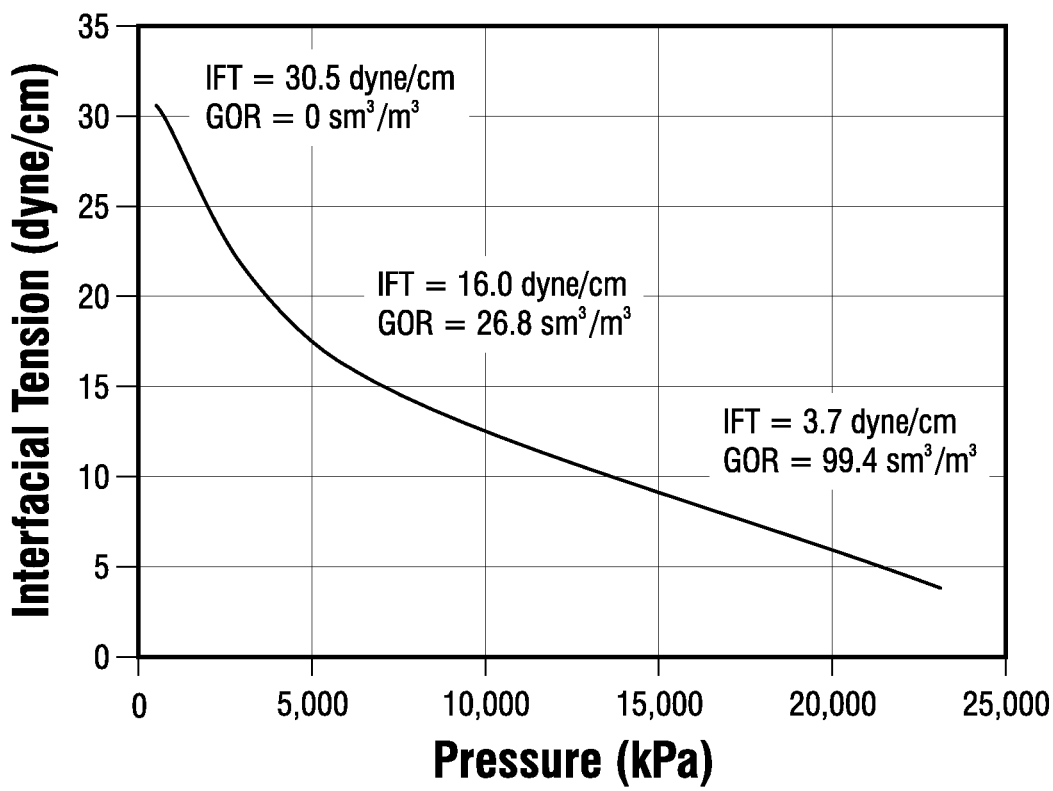
FIG. 10 is an interfacial tension-pressure graph of a methane saturated hydrocarbon mixture having a density of 810 kg/m3 at 50° C.
Figure 11:
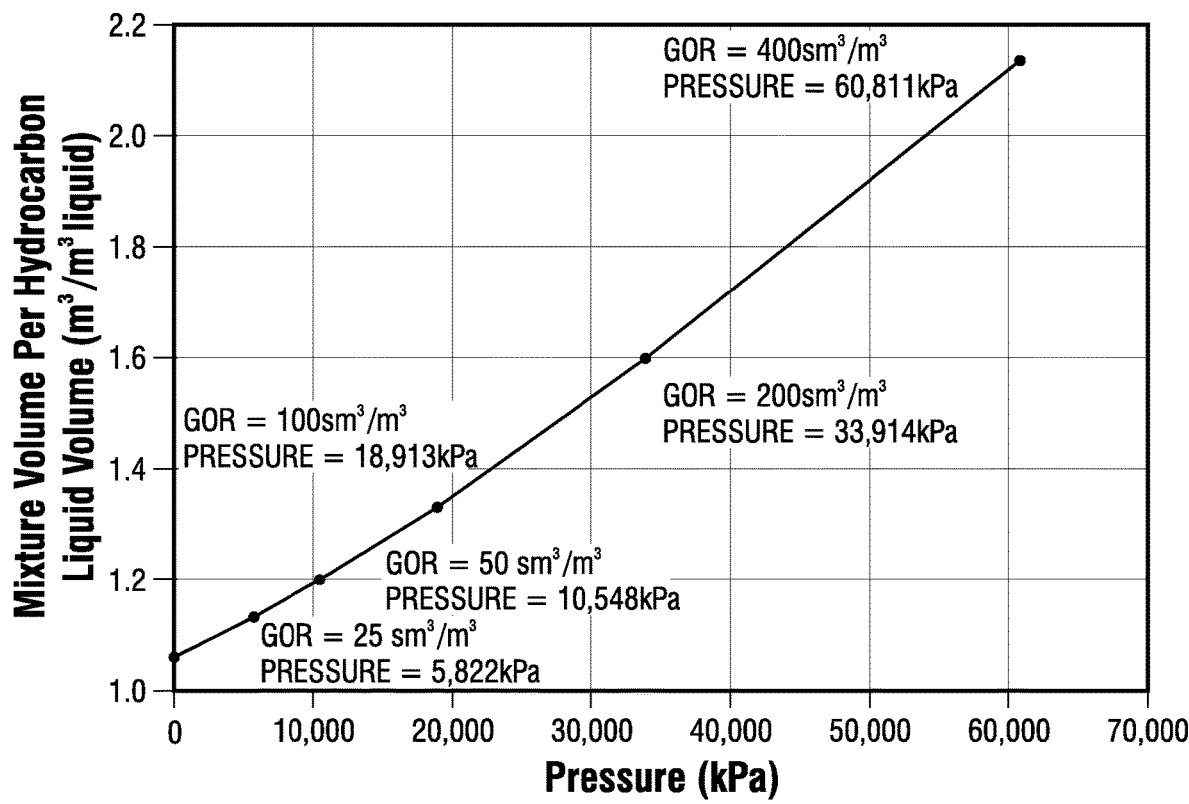
FIG. 11 is a volume-pressure graph of a natural gas saturated hydrocarbon mixture having a density of 800 kg/m3 at 50° C.
Figure 12:
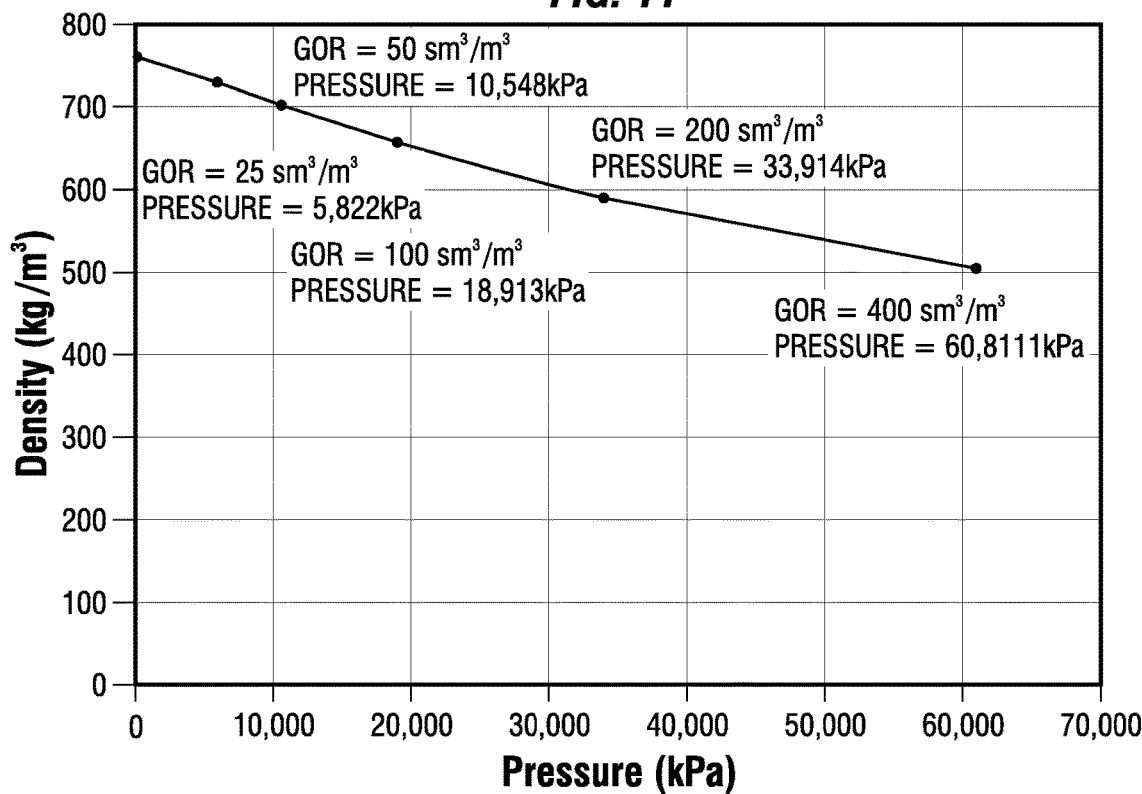
FIG. 12 is a density-pressure graph of a natural gas saturated hydrocarbon mixture having a density of 800 kg/m3 at 50° C.

When a hydrocarbon liquid is saturated with natural gas, certain behaviours of the resulting gas saturated hydrocarbon liquid are altered. This enables one to select a working fluid of a particular quantity and composition of natural gas that will achieve a certain behavioural change in a well servicing fluid mixture or recovery target material (e.g., a hydrocarbon liquid) when the natural gas dissolves in the well servicing fluid mixture or recovery target material to form the working fluid or well servicing mixture respectively. The effect of natural gas on hydrocarbon liquid behaviour are illustrated in FIGS. 9-12 where behaviors such as such volume, density, viscosity and surface tension of the hydrocarbon liquid can be changed by selecting a particular natural gas saturation. FIG. 9 provides laboratory test results illustrating the effect of dissolved gas on hydrocarbon liquid viscosity at 50° C. for an 810 $kg/m^3$ density hydrocarbon over a range of saturation pressures. The upper trace illustrates the change of dead oil viscosity with increasing pressure of the hydrocarbon alone (no dissolved natural gas); the lower trace illustrates the change in viscosity with increasing pressure of a methane gas saturated hydrocarbon mixture. The viscosity of the hydrocarbon decreases by a factor of almost three at about 23,000 kPa and a GOR approaching 100 $sm^3/m^3$ oil. FIG. 10 provides laboratory test results illustrating the change in interfacial tension with increasing pressure resulting from dissolved methane gas on the same 810 $kg/m^3$ density hydrocarbon. The interfacial tension is reduced from just over 30 dynes/cm at zero dissolved gas to 3.7 dynes/cm at a dissolved GOR of about 100 $sm^3/m^3$ oil. FIG. 11 illustrates the change in volume with increasing pressure for a natural gas saturated 800 $kg/m^3$ hydrocarbon at 50° C. Notably, the liquid volume is doubled with dissolved natural gas at 400 sm3/m3 at 60 MPa pressure. FIG. 12 plots the reduction in density of the liquid hydrocarbon over increasing pressure in a natural gas saturated 800 $kg/m^3$ hydrocarbon at 50° C.

As illustrated in FIGS. 9-12, the behaviors of hydrocarbon mixtures within wellbores and reservoirs can be significantly impacted by the presence of dissolved natural gas which can alter all of viscosity, interfacial tension, density, volume and phase state of the hydrocarbon mixture. Further, the selection of the hydrocarbon liquid composition and the quantity of natural gas added can further significantly alter behavior and properties of the resulting mixture. In this manner the addition of natural gas is effective in altering properties and behaviors when deployed in hydrocarbon based servicing applications and can be utilized to achieve a variety of desired effects.

Figure 13:
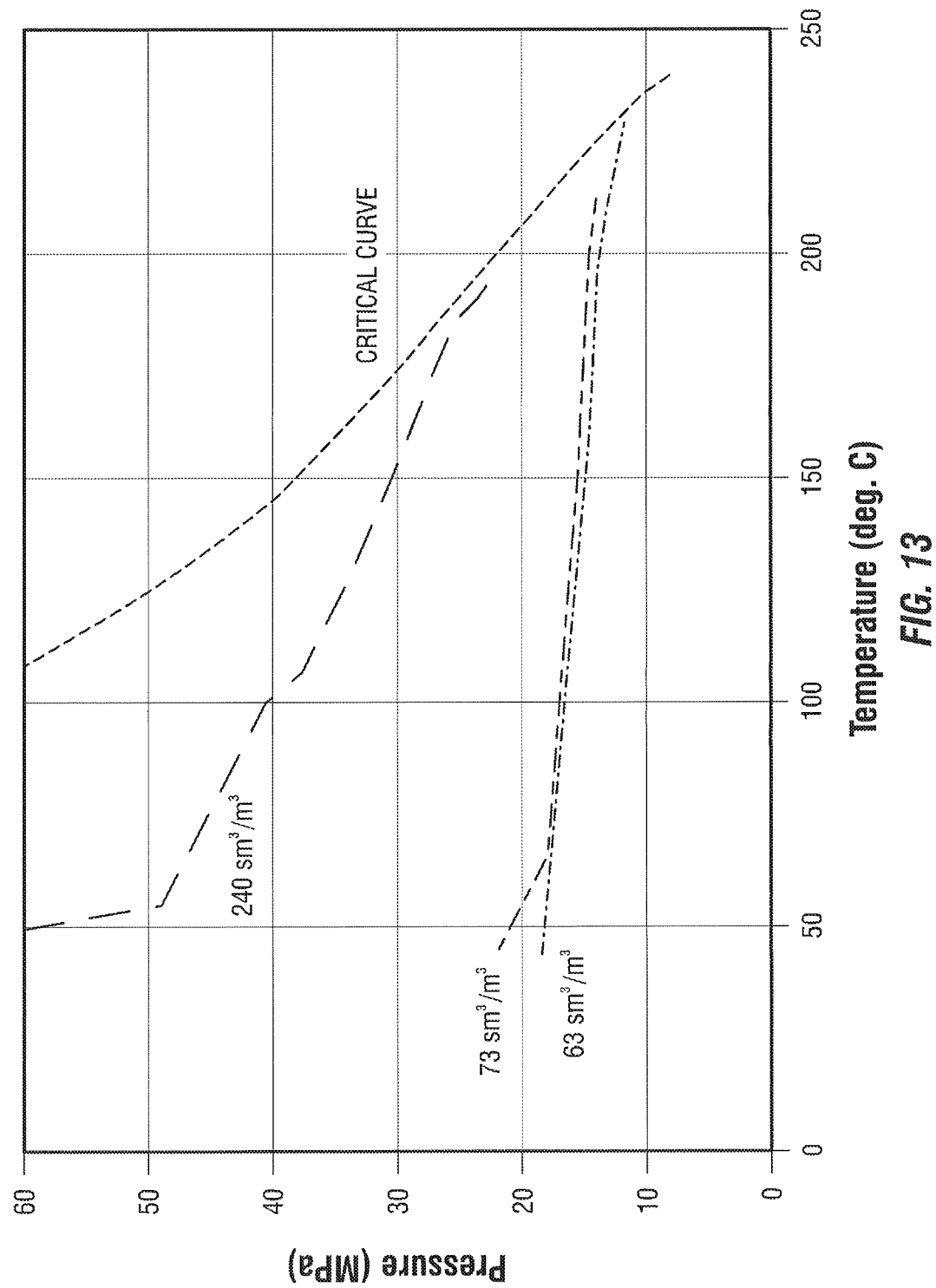
FIG. 13 is a pressure-temperature graph illustrating phase envelops of different methanol-methane mixtures.

Similar to mixtures comprising natural gas and hydrocarbon liquids, behaviors of other liquid recovery target materials may be altered with dissolved natural gas, such as certain organic liquids or aqueous mixtures containing dissolved organic liquids. FIG. 13 illustrates the solubility capacity at pressure and temperature of methanol and methane mixtures. The phase envelopes represent the bubble point conditions of methanol combined with selected ratios of methane. Accompanying the phase envelopes is the curve providing the critical pressure and temperature. Again, at pressures and temperatures above the bubble point, the methane and methanol mixture is in liquid phase and by virtue of the dissolved natural gas will exhibit differing properties from that of only methanol at the pressure and temperature. For example, at 18 MPa and 65.5 OC methanol saturated with this marginal natural gas ratio of 73 $sm^3/m^3$ results in a molar volume of 43.4 $cm^3/mol$ compared to 41.8 at the same conditions without natural gas.

Working fluids for well servicing can be or include mixtures of a liquid component with dissolved natural gas can be selected to achieve desired liquid behaviors. The desired mixture and behavior may be created on surface with selection of the liquid component composition, the natural gas composition, the natural gas content and the treating substance (if present). Alternatively, the desired mixture and behavior may be created within the wellbore or reservoir with selection of the working fluid content and composition in conjunction with the target material to be recovered.

First Embodiment: Working Fluid Comprising Natural Gas and a Delivery Target Material to be Placed in a Well During Well Servicing In a first embodiment, a working fluid comprising natural gas and a delivery target material is prepared such that the liquid phase of the working fluid contains a dissolved gas content during the servicing operation to place the delivery target material within the wellbore or reservoir of the well, and contains a free gas phase during the recovery steps of the operation. When the delivery target material is in a liquid phase, the working fluid is prepared such that the natural gas dissolves in the delivery target material under the well servicing conditions; when the delivery target material is in a solid phase, the working fluid further includes a well servicing liquid and the working fluid is prepared so that the delivery target material is mixed in the well servicing liquid and the natural gas is dissolved in the well servicing liquid under well servicing conditions. This embodiment may be particularly useful for well servicing operations to place a delivery target material comprising a treating material within the reservoir where the treating material is desired to easily flow into the matrix, readily disperse into smaller pores or extend the contact volume of the treating material. Further, the embodiment is useful where at least the applied gas phase of the recovered surface stream is desired to be captured at surface; the dissolved gas is released with reduced pressure, the gas phase is pipeline compatible and the wellhead flow pressure is sufficient to overcome at least the recovery system inlet pressure.

In this embodiment, at well servicing conditions, the natural gas content and composition is selected to ensure sufficient dissolved gas exists within the working fluid and to provide the desired dissolved gas behaviors during the well servicing operation injection and the desired released gas behavior during recovery. The dissolved natural gas content within the working fluid at the servicing conditions may be in the range of 5 mol % to 85 mol %. The injected working fluid can also include a liquid phase treating material in which the natural gas is dissolved, or a well servicing liquid in which the natural gas is dissolved, and which can also include the treating material (in solid or liquid phase). The surface injection pressure and temperature are selected so that the desired dissolved gas content exists within the working fluid at the servicing condition; this state is maintained within the wellbore or reservoir during placement of the material to be delivered. Further, the surface recovery pressure is selected so that the desired quantity of dissolved gas is released from the working fluid at the servicing point recovery pressure; this state is maintained within the wellbore or reservoir where at least some of the dissolved natural gas is released and separates from the material to be delivered such that it remains within the wellbore or reservoir. The remaining working fluid, now mostly devoid of the delivery material is then flowed to surface and recovered.

Maintaining the working fluid with the desired dissolved gas content during the servicing step is desirable as the dissolved gas content permits ready flow and dispersion of the delivery target material to enhance placement during injection; flow and dispersion properties of the liquid phase are improved by reduced viscosity and surface tension resulting from the dissolved gas. Subsequently during recovery, the dissolved gas is released from the liquid treating material to impair flow and dispersion properties to permit deposition of the treating material and recovery of at least the released gas; flow and dispersion properties of the liquid phase are reduced by increased viscosity and surface tension resulting from the reduction in dissolved gas. The natural gas content within the working fluid, the composition of the natural gas, the composition of the well servicing liquid, the composition of the treating material or combinations thereof are manipulated to ensure sufficient dissolved gas for enhanced placement and the desired released gas content to permit recovery. Separation of the natural gas from at least the treating material within the injected natural gas working fluid is accomplished with pressure reduction as applied to recover the accompanying working fluids; the reduced pressure results in release of at least some of the dissolved gas. Separation of the gas for recovery may be accomplished by a number of processes such as density contrast between the well servicing liquid and the natural gas, preferential holding of the well servicing liquid within pores by capillary force differences between the gas and liquid phases, or greater flow resistive force on the liquid phase than a gas phase; surface tension will alter capillary forces while viscosity alters flow resistive forces. Increased volume and improved dispersion of the treating material liquid within or by dissolved gas into the wellbore or reservoir may allow a smaller quantity of the treating material to be applied, or may provide more efficient or effective coverage of a given quantity of the treating material. Further upon recovery of the well servicing mixture at recovery conditions, the natural gas will separate from the well servicing mixture to create at least an evolved gas phase fraction for capture. Additionally, as the released natural gas returns to the surface, it provides energy by expansion which can further enhance wellhead pressure to ensure the recovery wellhead pressure is achieved.

Second Embodiment: Working Fluid Comprising Natural Gas and a Treating Material to Remove a Recovery Target Material During Well Servicing A second embodiment involves creating a working fluid on surface that can include natural gas, a treating material and optionally a well servicing liquid, and that when injected into the well will mix with a recovery target material to form a well servicing mixture containing dissolved natural gas in the recovery target material, and remove the recovery target material during the well servicing operation. The well servicing mixture will release natural gas during the recovery steps of the operation. This embodiment is particularly useful for well servicing operations to place treating materials (e.g., the delivery target material) and subsequently remove unwanted materials (e.g., the recovery target material) where: the treating material is desired to easily flow into the reservoir matrix, readily disperse into smaller pores or surfaces, extend the volume of the liquid treating material to better contact an unwanted material throughout a wellbore or into a reservoir, or presence of a released expanding gas within the well servicing mixture during recovery to assist with entrainment, transport or removal of the unwanted material or its reaction product from the wellbore or reservoir; when a sufficient quantity of natural gas dissolves in the working fluid liquid component, or extended contact time of the treating material on the unwanted material is desired. Further, the embodiment is useful where: the recovery target material is a liquid held within the matrix of the reservoir and the injected or evolved natural gas component will serve to displace, mix with and dissolve into the unwanted liquid during injection to enhance the flow and capillary release properties to assist recovery of the unwanted liquid from the reservoir. Further, during recovery, at least some of the dissolved gas will be released from the unwanted liquid to expand and maintain pressure to flow the liquid from the reservoir, use of the released gas as an expanding gas to assist with entrainment, transport, displacement, erosion or removal of the unwanted material from the wellbore or reservoir, or to reduce hydrostatic within the wellbore to maximize drawdown pressure. The embodiment is also useful where at least the released gas phase of the recovered surface stream is desired to be captured at surface; the gas phase is pipeline compatible and the wellhead flow pressure is sufficient to overcome at least the recovery system inlet pressure.

In this embodiment, at common servicing conditions, the natural gas content and composition of the natural gas working fluid is controlled to ensure sufficient dissolved gas exists within the well servicing mixture created within the wellbore or reservoir during the well servicing injection operation and the desired released gas behavior during recovery. The dissolved natural gas content within the well servicing mixture at the servicing conditions may be in the range of 5 mol % to 85 mol %. The injected working fluid contains natural gas, a treating material and optionally a well servicing liquid. The treating material can be in a liquid phase or a solid phase. The working fluid can optionally include a well servicing liquid, wherein a solid phase treating material may be mixed in the liquid well servicing liquid. The surface injection pressure and temperature are selected so that the desired dissolved gas content exists within the well servicing mixture at the servicing condition; this state is maintained within the wellbore or reservoir where the unwanted material to be removed mixes with, is entrained by or is displaced by the injected working fluid to form one aspect of the well servicing mixture. Further, the surface recovery pressure is selected so that the desired quantity of dissolved gas is released from the well servicing mixture at the servicing point recovery pressure; this state is maintained within the wellbore or reservoir where the unwanted material to be removed further mixes with, is entrained by or is displaced by the injected working fluid to form a further aspect of the well servicing mixture. The well servicing mixture with a sufficient free gas phase can then be readily flowed to surface and recovered.

Maintaining the well servicing mixture with the dissolved gas content during the servicing step is desirable as the dissolved gas permits flow, wettability and volume characteristics to assist placement of the treating substance within the wellbore or reservoir; the reduced surface tension and viscosity resulting from the dissolved gas will ensure effective dispersion of the treating substance to contact the unwanted material when a sufficient quantity of natural gas dissolves in the working fluid liquid component. Further, the increased well servicing mixture volumes resulting from the dissolved gas will allow a greater surface to be contacted. Similarly, for a given well servicing mixture volume, the injection duration may be increased by the additional dissolved gas volume to enhance contact time between the well servicing mixture and the unwanted material. Upon reducing pressure to initiate recovery, the released gas from the well servicing mixture will enhance transport of unwanted material from the reservoir and wellbore. Enhanced carrying, entraining or displacing capacity of the natural gas containing well servicing mixture can be achieved with the natural gas working fluid by adding selected treating materials; such as chemicals to dissolve, disperse, or react to form transportable products with the unwanted material. Further, at least some of the released gas may contact and dissolve into the unwanted material to enhance flow and recovery properties. The natural gas content in the working fluid, the composition of the natural gas, the composition of the well servicing liquid, the composition of the treating material, the composition and state of the unwanted material or combinations thereof can be manipulated to achieve the desired dissolved gas quantity and behaviors. Further, upon surface recovery of the servicing fluids at recovery conditions, the natural gas can be readily separated from the mixture to create at least a gas phase fraction for capture. Additionally, as the released natural gas returns to the surface, it provides energy by expansion which further enhances removal of liquid or solids portion of the well servicing mixture by increasing volume, hence velocity, and reducing the hydrostatic pressure within the wellbore.

Third Embodiment: Working Fluid Comprising 100% Natural Gas for Removing a Recovery Target Material During Well Servicing A third embodiment involves selecting the working fluid composition to be 100% natural gas and creating a well servicing mixture with natural gas and at least one recovery target material contained within the wellbore or reservoir such that the resulting mixture contains a dissolved natural gas content during the servicing and evolved natural gas during the recovery steps of the operation. This embodiment is particularly useful for well servicing operations to remove unwanted materials (e.g., the recovery target material) where: the unwanted material is a liquid held within the matrix of the reservoir and injected natural gas will serve to displace, mix with and dissolve into the unwanted liquid during injection to enhance the flow and capillary release properties to assist recovery the unwanted liquid from the reservoir. Further, during recovery, at least some of the dissolved gas will be released from the unwanted liquid to expand and maintain pressure to flow the liquid from the reservoir, use of the released gas as an expanding gas to assist with entrainment, transport, displacement, erosion or removal of the unwanted material from the wellbore or reservoir, or to reduce hydrostatic within the wellbore to maximize drawdown pressure. The embodiment may also be useful to determine reservoir injectivity behaviors towards assessing viability of an enhanced recovery project, if desired. Further, the embodiment may be useful where at least the gas phase of the recovered well servicing mixture is to be captured at surface; the gas phase is pipeline compatible and the wellhead flow pressure is sufficient to overcome at least the recovery system inlet pressure.

In this embodiment, at common servicing pressures, the natural gas composition is controlled to ensure that a dissolved gas content exists within a well servicing mixture created within the wellbore or reservoir during the well servicing operation. The well servicing mixture can include the injected natural gas which combines with a liquid recovery target material contained within the well. The dissolved natural gas content within the well servicing mixture at the servicing conditions may be in the range of 5 mol % to 80 mol %. As noted the injected working fluid contains only natural gas. The surface injection pressure and temperature are selected so that the dissolved gas content exists within the well servicing mixture at the servicing condition; this state is maintained within the wellbore or reservoir where the unwanted material to be removed mixes with, is entrained by or is displaced by the injected natural gas to form one aspect of the well servicing liquid mixture. Further, the surface recovery pressure is selected so that the desired quantity of dissolved gas is released from the well servicing mixture at the servicing point recovery pressure; this state is maintained within the wellbore or reservoir where the unwanted material to be removed is entrained by or is displaced by the released gas The well servicing mixture with a sufficient free gas phase can then be readily flowed to surface and recovered.

Injection of only the natural gas stream may permit effective flow through the reservoir matrix to maximize contact of the unwanted liquid within the reservoir. Maintaining the well servicing mixture with dissolved gas content during the servicing step is desirable as the dissolved gas permits flow and capillary forces to enhance removal of the unwanted liquid from the wellbore or reservoir during the recovery step; the reduced surface tension and viscosity resulting from the dissolved gas will ensure effective mobility. Upon reducing pressure to initiate recovery, the quantity of released gas is controlled to retain at least some of the dissolved gas in solution while the released gas from the well servicing mixture will enhance transport of the unwanted liquid from the reservoir and wellbore. The natural gas quantity, the composition of the natural gas, the composition and state of the unwanted liquid or combinations thereof can be manipulated to achieve the desired dissolved gas quantity and behaviors. Further, upon surface recovery of the unwanted liquid at recovery conditions, at least some of the natural gas can be separated from the well servicing mixture to create at least a gas phase fraction for capture. Additionally, as the released natural gas returns to the surface, it provides energy by expansion which further enhances removal of the liquid portion of the well servicing mixture by increasing velocity, and reducing the hydrostatic pressure within the wellbore.

Notably, use of a working fluid comprising 100 vol % natural gas permits control of the hydrostatic pressure within the wellbore or reservoir. For a matrix injection operation, the bottom hole injection pressure to the reservoir can be easily controlled to ensure feed of the injected natural gas is above the reservoir pressure while also ensuring the reservoir injection pressure is below the formation fracturing pressure. During recovery of the matrix injection operation, the reduced hydrostatic resulting from the natural gas within the flow stream will allow additional drawdown to be applied at the reservoir, thereby releasing a greater portion of capillary trapped liquids, plus providing a larger pressure potential to increase flow rate to speed recovery Control of the recovery pressure may allow control of the dissolved gas in the liquid and released gas from the liquid to permit the optimum balance between retaining the beneficial properties of the dissolved gas and ensuring sufficient released gas to support recovery.

Fourth Embodiment: Sequential Natural Gas Injection with a Well Servicing Fluid Mixture to Minimize Servicing Fluid Phase Mixing During Well Servicing A further embodiment relates to well servicing operations using a working fluid comprising natural gas, wherein the working fluid and a well servicing fluid mixture are injected into the wellbore sequentially and mixing between the injected fluids is minimized in order to better maintain the individual behaviors or properties of the injected well servicing fluid mixtures and working fluid. This embodiment is particularly useful for well servicing operations to apply a well servicing liquid and/or a treating material or to remove unwanted materials where: liquid phase properties of a treating material and/or well servicing fluid mixture must be maintained, the properties of the working fluid as injected are to be maintained, and control of the hydrostatic is needed to maintain the servicing conditions. In this embodiment, the well servicing fluid mixture can be or include a well servicing liquid and dissolved natural gas up to saturation to gain the desired behavior benefit. Also, the natural gas working fluid may be caused to mix with and dissolve into the well servicing fluid mixture, treating material or unwanted material during the servicing or recovery step to gain the benefit of dissolved gas within the liquid. Further, the embodiment may be useful where at least the gas phase of the recovered surface stream is to be captured at surface; the gas phase contamination may be minimized and pipeline compatible and the wellhead flow pressure can be sufficient to overcome at least the recovery system inlet pressure. In this manner the injected fluids form a well servicing mixture containing dissolved natural gas within an existing liquid phase. Within a wellbore where the sequential injection method has been applied, a selected volume of natural gas will exist, for example in the upper portion of the wellbore and exhibits a hydrostatic pressure, and a selected volume of well servicing fluid mixture exists in a lower portion of the wellbore and exhibits an additional hydrostatic, the overall hydrostatic will be the sum of the two individual hydrostatic columns.

What is claimed is:

1. A method for servicing a hydrocarbon well using natural gas in a well intervention operation, comprising:
   preparing a working fluid having a composition comprising natural gas between about 5 molar percent (mol %) to about 100 mol % based on specified well intervention conditions, wherein the specified well intervention conditions comprise at least one of a specified reservoir temperature and a specified reservoir pressure, a specified reservoir fracturing pressure, a specified surface recovery pressure, a specified servicing depth, or a specified wellbore configuration and a specified wellbore geometry;
   injecting the working fluid into the well;
   mixing, within well, the working fluid with at least a portion of a recovery target material already present within the well and comprising at least one of a wax, an emulsion, a hydrocarbon liquid, a reservoir fluid, or a precipitate such that at least some of the natural gas dissolves into the recovery target material to form a liquid phase well servicing mixture of the natural gas and recovery target material; and
   recovering at least some of the well servicing mixture at surface to remove the mixed recovery target material from the well.

2. The method of claim 1, wherein the working fluid comprises a delivery target material comprising a treating material and at least some of the natural gas dissolves in the delivery target material at the specified well intervention conditions, and the method further comprises contacting the recovery target material with the delivery target material during the well servicing operation.

3. The method of claim 2, wherein the delivery target material is a treating material that causes at least one of a physical or chemical change in the recovery target material in the process of forming the liquid phase well servicing mixture.

4. The method of claim 3, wherein the recovery target material is a sulfur deposit and the delivery target material is a sulfur solvent.

5. The method of claim 1, wherein the working fluid further comprises a well servicing liquid.

6. The method of claim 5, wherein the well servicing liquid comprises an aqueous liquid, an organic liquid, a hydrocarbon liquid, or any mixture thereof.

7. The method of claim 6, wherein the well servicing liquid comprises the aqueous liquid, and wherein the aqueous liquid comprises a dissolved salt, an acid, a water soluble organic material, or any mixture thereof.

8. The method of claim 6, wherein the well servicing liquid comprises the organic liquid, and wherein the organic liquid comprises an alcohol, a ketone, an ester, an amide, an aldehyde, a carboxylic acid, an amide, or any mixture thereof.

9. The method of claim 6, wherein the well servicing liquid comprises the hydrocarbon liquid, and the hydrocarbon liquid comprises an alkane, an alkene, an alkyne, an aromatic, or any mixture thereof.

10. The method of claim 6, wherein the working fluid further comprises a solid phase delivery target material.

11. The method of claim 6, wherein the natural gas is sourced from liquefied natural gas.

12. The method of claim 6, wherein the recovery target material is a reservoir fluid, and wherein during the well intervention operation, the working fluid is injected into a reservoir of the well such that the natural gas contacts the reservoir fluid and forms the liquid phase well servicing mixture.

13. The method of claim 6, wherein the recovery target material is a hydrocarbon liquid and the well intervention operation comprises decreasing the viscosity of the hydrocarbon liquid and the working fluid has a quantity of natural gas sufficient to fully saturate the hydrocarbon liquid under the specified well intervention conditions.

14. The method of claim 1, wherein the recovery target material or a delivery target material or the well servicing fluid is a hydrocarbon liquid and the well intervention operation comprises decreasing the interfacial tension of the hydrocarbon liquid and the working fluid has a quantity of natural gas sufficient to fully saturate the hydrocarbon liquid under the specified well intervention conditions.

15. The method of claim 1, wherein the recovery target material or a delivery target material or the well servicing fluid is a hydrocarbon liquid, and the well intervention operation comprises increasing a volume of the hydrocarbon liquid, and the working fluid has a selected quantity of natural gas that will at least fully saturate the hydrocarbon liquid under the specified well intervention conditions.

16. The method of claim 1, wherein the recovery target material or the delivery target material or the well servicing fluid is a hydrocarbon liquid, and the well intervention operation comprises decreasing a density of the hydrocarbon liquid, and the working fluid has a selected quantity of natural gas that will at least fully saturate the hydrocarbon liquid under the specified well intervention conditions.

* * * * *